United States Patent
Goff et al.

(10) Patent No.: US 11,656,316 B2
(45) Date of Patent: May 23, 2023

(54) POSITION AND ORIENTATION TRACKING SYSTEM, APPARATUS AND METHOD

(71) Applicant: ENSCO, Inc., Springfield, VA (US)

(72) Inventors: Daniel Thomas Goff, Springfield, VA (US); Robert Barlow Alwood, Springfield, VA (US); William Todd Faulkner, Asheville, NC (US); William Petersen Lounsbury, Springfield, VA (US)

(73) Assignee: ENSCO, Inc., Springfield, VA (US)

( * ) Notice: Subject to any disclaimer, the term of this patent is extended or adjusted under 35 U.S.C. 154(b) by 294 days.

(21) Appl. No.: 17/057,602

(22) PCT Filed: Jun. 28, 2018

(86) PCT No.: PCT/US2018/040111
§ 371 (c)(1),
(2) Date: Nov. 20, 2020

(87) PCT Pub. No.: WO2019/221763
PCT Pub. Date: Nov. 21, 2019

(65) Prior Publication Data
US 2023/0010006 A1  Jan. 12, 2023

(51) Int. Cl.
*G01S 5/10* (2006.01)
*G01S 5/02* (2010.01)
(Continued)

(52) U.S. Cl.
CPC .......... *G01S 5/0247* (2013.01); *G01S 5/0264* (2020.05); *G01S 5/0284* (2013.01); *G01S 5/0289* (2013.01);
(Continued)

(58) Field of Classification Search
CPC ......... G01S 5/0289; G01S 5/0264; G01S 5/10
(Continued)

(56) References Cited

U.S. PATENT DOCUMENTS

| 5,245,347 A | 9/1993 | Bonta et al. |
| 2009/0207071 A1 | 8/2009 | Kinoshita et al. |

(Continued)

FOREIGN PATENT DOCUMENTS

| EP | 2302407 A1 | 3/2011 |
| JP | 4343581 B2 | 10/2009 |
| WO | 2018/066291 A1 | 4/2018 |

OTHER PUBLICATIONS

Authorized Officer Shane Thomas, International Search Report and Written Opinion dated Aug. 3, 2018 in International Application No. PCT/US2018/33399.
(Continued)

*Primary Examiner* — Harry K Liu
(74) *Attorney, Agent, or Firm* — Kaplan Breyer Schwarz, LLP

(57) ABSTRACT

A position and orientation determining system includes a first radio frequency (RF) device including at least one antenna configured to receive and transmit RF signals, a first radio unit in communication with the at least one antenna, and an inertial measurement unit (IMU). The system further includes a second RF device includes a constellation of antennae including at least three receiving antennae, a second radio unit in communication with the constellation of antennae, and a processor configured to determine a three-dimensional position and three-axis angular orientation of the first RF device relative to the second RF device based on computing at least two of three angles in the second RF device coordinate frame (XY, XZ and YZ) computed from carrier phase difference (CPD) measurements taken between each pair of the at least three receiving antennae when receiving a single RF signal transmitted from the at least one antenna of the first RF device, and estimating a direction of a gravity vector generated by the IMU.

26 Claims, 33 Drawing Sheets

(51) Int. Cl.
  *G01S 19/51* (2010.01)
  *G01S 19/54* (2010.01)
  *G06F 3/01* (2006.01)

(52) U.S. Cl.
  CPC ............... *G01S 5/10* (2013.01); *G01S 19/51* (2013.01); *G01S 19/54* (2013.01); *G06F 3/011* (2013.01)

(58) Field of Classification Search
  USPC ........................................................ 342/463
  See application file for complete search history.

(56) References Cited

U.S. PATENT DOCUMENTS

| | | | |
|---|---|---|---|
| 2010/0328073 A1 | 12/2010 | Nikitin et al. | |
| 2011/0090114 A1* | 4/2011 | Fenton .................... | G01S 19/54 702/150 |
| 2013/0336417 A1 | 12/2013 | Takei | |
| 2014/0125518 A1 | 5/2014 | Feller | |
| 2014/0327579 A1 | 11/2014 | Hart et al. | |
| 2015/0219747 A1 | 8/2015 | Thevenet et al. | |
| 2015/0346332 A1 | 12/2015 | Taylor, Jr. et al. | |
| 2016/0026253 A1 | 1/2016 | Bradski et al. | |
| 2021/0208232 A1 | 7/2021 | Alwood et al. | |
| 2021/0263142 A1 | 8/2021 | Alwood et al. | |

OTHER PUBLICATIONS

Authorized Officer: Shane Thomas, International Search Repod and Written Opinion issued in corresponding PCT application No. PCT/US2018/033358, dated Aug. 23, 2018, 15 pp.
Authorized Officer: Shane Thomas, International Search Report and Written Opinion issued in counterpart PCT application No. PCT/US2018/040111, 7 pp., dated Sep. 7, 2018.
Non-Final Rejection dated Feb. 3, 2022 for U.S. Appl. No. 17/056,564.
Non-Final Rejection dated Feb. 16, 2023 for U.S. Appl. No. 17/056,673.

* cited by examiner

800 →

POSITION AND ORIENTATION TRACKING SYSTEM, APPARATUS AND METHOD

FIELD

This disclosure generally relates to the detection and tracking of an electronic device in an augmented and/or virtual reality environment. The disclosure more particularly relates to determining a position and angular orientation of an electronic device relative to an environment and/or a coordinate frame, and thereby sending signals to a graphic display based on determining the position and angular orientation of the electronic device.

BACKGROUND

An augmented reality (AR) and/or a virtual reality (VR) system may generate a visual three-dimensional (3D) immersive environment. A user may experience this virtual environment through interaction with various electronic devices, such as, for example, a helmet or other head mounted device including a display, glasses or goggles that a user looks through when viewing a display device, gloves fitted with sensors, external handheld devices that include sensors, and other such electronic devices. Once immersed in the AR/VR environment, user interaction with the AR/VR environment may take various forms, such as, for example, physical movement and/or manipulation of the handheld electronic device and/or the head mounted device to interact with, personalize and control the virtual environment.

A user immersed in an AR/VR reality environment wearing, for example, a head mounted display (HMD) device may explore the 3D virtual environment and interact with the 3D virtual environment through, for example, physical interaction (such as, for example, hand/arm gestures, head movement, walking and the like) and/or manipulation of the HMD and/or a separate electronic device to experience the virtual environment. For example, in some implementations, the HMD may be paired with a handheld electronic device, such as, for example, a controller, a gyro mouse, or other such handheld electronic device. User manipulation of the handheld electronic device paired with the HMD may allow the user to interact with the features in the virtual environment generated by the HMD.

However, tracking objects for AR/VR within the virtual environment is a challenging problem since tracking must be fast and accurate enough to track real-time motion for an AR/VR operator to use a variety of motions without motion sickness or a sense of "clunkiness." Typical problems that exist with six degrees of freedom tracking in AR/VR environments may include: the lack of smooth and accurate tracking of a controller's position and attitude relative to another sensor system, e.g., the HMD, and/or relative to the world and real objects in the immediate environment; large latency issued leading to non-real-time tracking; a lack of robustness of tracking performance when line-of-sight between the HMD and a controller is obscured or blocked; and high system and component cost and complexity not suitable for commercial applications.

SUMMARY

The illustrative embodiments of method, systems and devices presented herein provide high resolution position and orientation determination of RF devices based on carrier signals being transmitted between two corresponding RF devices. Once the carrier signals are received by corresponding antennae on each of the RF devices, the carrier signals are processed to determine a number of distance and velocity products that may be coupled with RF device inertial data to very accurately determine both the position and orientation of one RF device relative to the other RF device.

In one illustrative embodiment disclosed herein, a position determining system includes a first radio frequency (RF) device including at least one antenna configured to receive and transmit RF signals, and a first radio unit in communication with the at least one antenna. The position determining system further includes a second RF device including a constellation of antennae including at least three receiving antennae, a second radio unit in communication with the constellation of antennae; and a processor. The processor is configured to determine a three-dimensional position of the first RF device relative to the second RF device based on computing at least two of three angles in the second RF device coordinate frame (XY, XZ and YZ) computed from carrier phase difference (CPD) measurements taken between each pair of the at least three receiving antennae when receiving a single RF signal transmitted from the at least one antenna of the first RF device.

In another illustrative embodiment disclosed herein, a position and orientation determining system includes a first radio frequency (RF) device including at least one antenna configured to receive and transmit RF signals, a first radio unit in communication with the at least one antenna and an inertial measurement unit (IMU). The position determining system further includes a second RF device including a constellation of antennae including at least three receiving antennae, a second radio unit in communication with the constellation of antennae; and a processor. The processor is configured to determine a three-dimensional position of the first RF device relative to the second RF device based on computing at least two of three angles in the second RF device coordinate frame (XY, XZ and YZ) computed from carrier phase difference (CPD) measurements taken between each pair of the at least three receiving antennae when receiving a single RF signal transmitted from the at least one antenna of the first RF device, and further estimating a direction of a gravity vector generated by the IMU.

In another illustrative embodiment disclosed herein, a method of determining a three-dimensional position of a first radio frequency (RF) device relative to a second RF device. The method includes providing the first RF device including at least one antenna configured to receive and transmit RF signals, and a first radio unit in communication with the at least one antenna. The method further includes providing the second RF device including a constellation of antennae including at least three receiving antennae, a second radio unit in communication with the constellation of antennae, and a processor in communication with the second radio unit and the constellation of antennae. The method further includes determining, by the processor of the second RF device, a three-dimensional position of the first RF device relative to the second RF device based on computing at least two of three angles in the second RF device coordinate frame (XY, XZ and YZ) computed from carrier phase difference (CPD) measurements taken between each pair of the at least three receiving antennae when receiving a single RF signal transmitted from the at least one antenna of the first RF device.

It should be appreciated that this Summary is provided to introduce a selection of concepts in a simplified form that are further described below in the Detailed Description. This Summary is not intended to be used to limit the scope of the claimed subject matter.

BRIEF DESCRIPTION OF THE SEVERAL VIEWS OF THE DRAWINGS

The illustrative embodiments of the invention will be better understood from the following detailed description with reference to the drawings, which are not necessarily drawing to scale and in which.

DETAILED DESCRIPTION

The illustrative embodiments presented herein for six-degrees of freedom tracking leverages previously developed and patented high accuracy and precision, high measurement rate radio frequency (RF) sensing methods. These RF sensing methods, referred to as Timing, Communications, and Ranging (TCR) technology, and previously as Distance Measuring Radio, (DMR) use several patented measurement methods.

Figure 1:
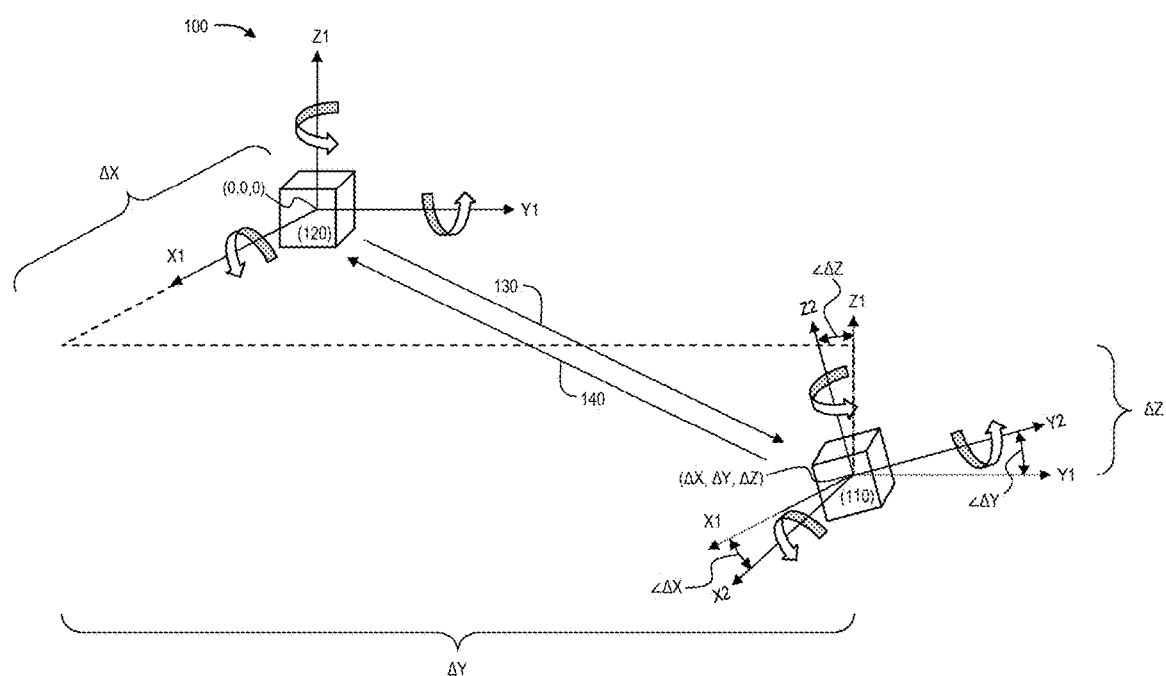
FIG. 1 illustrates a schematic diagram of the general context of the illustrative embodiments presented herein of a position and orientation tracking system.

FIG. 1 illustrates a schematic diagram of the general context of the illustrative embodiments presented herein of a position and orientation tracking system 100 that tracks a three-coordinate position and three-axis angular orientation or attitude of a first RF device 110 with respect to and from a second RF device 120. In one illustrative embodiment, the first RF device 110 may be referred to as a hand-held TCR Controller device 110 that is tracked with respect to the second RF device 120 that may be referred to as an instrumented TCR HMD device 120.

The illustrative embodiments presented herein build upon TCR data preprocessing, most notably the unwrapping of carrier phase raw data observables, (Carrier Phase Range (CPR), and Carrier Phase Difference (CPD), as discussed more in detail below). Some illustrative embodiments presented herein also provide sensor fusion algorithms that process the raw data observables and further process the output of the sensor fusion algorithms with an Extended Kalman Filter (EKF) to finally produce a fused data product from the TCR and an aiding Inertial Measurement Unit (IMU) sensor. The illustrative embodiments presented herein provide post-processed six-degrees of freedom results but may also be designed to be causal and support real-time processing.

For example, with respect to FIG. 1, tracking six-degrees of freedom of the TCR Controller device 110 from the TCR HMD device 120 in 3-D coordinate space includes determining: 1) a ΔX, ΔY and ΔZ position (ΔX, ΔY, ΔZ) of the TCR Controller device 110 from a position, e.g., (0,0,0) of the TCR HMD device 120; and 2) an angular orientation ∠ΔX, ∠ΔY and ∠ΔZ, that is, the angular difference between the coordinate frame of the TCR Controller device 110 (X2, Y2, Z2) and the TCR HMD device 120 (X1, Y1, Z1), e.g., (X2-X1), (Y2-Y1) and (Z2-Z1).

The illustrative embodiments presented herein are envisioned to be an ideal sensor and signal processing solution for "Inside Out"-type VR/AR tracking. "Inside Out" tracking positions a controller(s), and potentially other real objects, relative to the TCR HMD device 120. "Inside-out" tracking is a method of positional tracking commonly used in virtual reality (VR) technologies, specifically for tracking the position of head-mounted displays (HMDs) and motion controller accessories. It differentiates itself from "outside-in" tracking by the location of the cameras or other sensors that are used to determine the object's position in space. In "inside-out" positional tracking, the camera or sensors are located on the device being tracked (e.g. HMD) while in "outside-in" the sensors are placed in a stationary location. At present, most commercially available systems, such as the Valve Lighthouse™, use "outside-in" tracking, where a HMD device and controller device are positioned relative to some fixed infrastructure sensors (not shown).

The illustrative embodiments presented herein currently achieves better than 1.0 cm positioning accuracy and precision, and better than one-degree angular orientation accuracy and precision for typical use cases. Key technical challenges for real-world use of the illustrative embodiments presented herein are robustness to radio frequency (RF) occlusion, multipath, and interference for the TCR measurement system. The illustrative embodiments presented herein may be capable of operation in typical office/home environments, however, additional signal processing, sensor pre-filtering, and sensor aiding are discussed herein that may further improve the technology performance, robustness and broaden applicability.

I. System Design

The six-degrees of freedom tracking illustrative embodiments presented herein are designed to solve close range six-degrees of freedom tracking between RF radio devices via a flexible system architecture. System architecture configurations may include: 1) using one or more transmit (Tx) channels per TCR device, (e.g., TCR HMD device 120 and at least one Controller device(s) 100; 2) using two or more receive (Rx) channels on the TCR HMD device 120 to constrain or over-constrain a two-dimension (2-D) or 3-D position of the TCR Controller device 110 with CPD measurements; and/or 3) using one or more Rx channels on the TCR Controller device 110.

Figure 2:
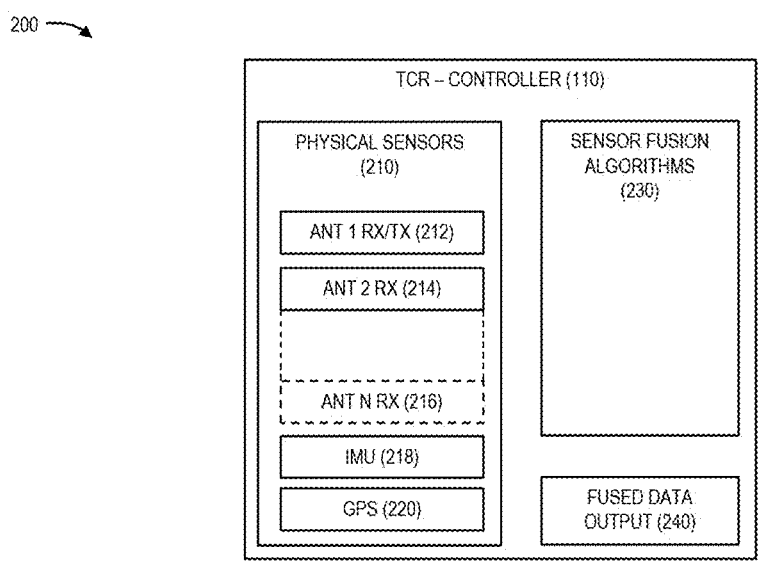
FIG. 2 illustrates a logical element schematic of a TCR Controller device.

FIG. 2 illustrates a logical element schematic 200 of TCR Controller device 110 comprising a plurality of physical sensors 210 that collect raw data observables and include a first Rx/Tx antenna 212, a second Rx antenna 214, an nth numbered Rx antenna 216, an IMU device 218 and a GPS device 220. Reference number 230 illustrates a logical element represents sensor fusion algorithms that processes raw data observables to create fused data output 240.

Figure 3:
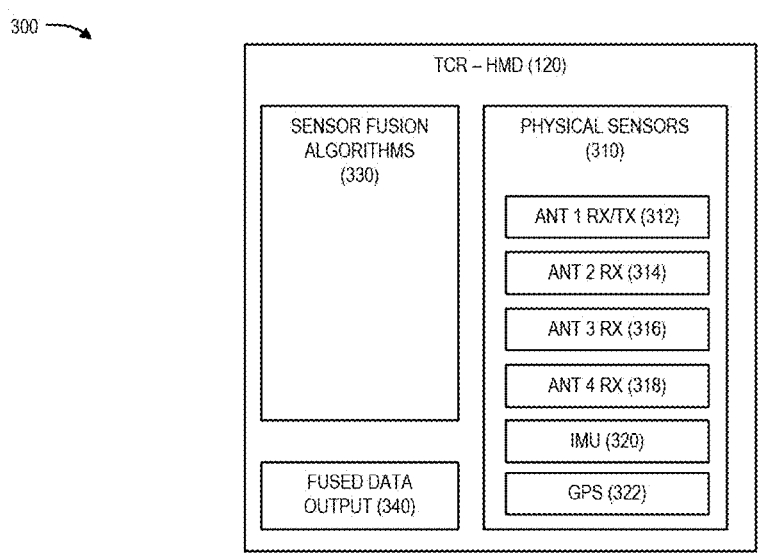
FIG. 3 illustrates a logical element schematic of a HMD device.

FIG. 3 illustrates a logical element schematic 300 of TCR HMD device 120 comprising a plurality of physical sensors 310 that collect raw data observables and include a first Tx/Rx antenna 312, a second Rx antenna 314, a third Rx antenna 316, a fourth Rx antenna 318, an IMU device 320 and a GPS device 322. Reference number 330 illustrates a logical element represents sensor fusion algorithms that processes raw data observables to create fused data output 340.

A single Tx/Rx channel, (e.g., a transceiver channel), aids in constraining the TCR Controller device 110 position via a Baseband Range, CPR, carrier phase velocity (CPV), and TDR measurements, described in more detail below. Two or more Rx channels on the TCR Controller device 110 aids in constraining the TCR Controller device 110 heading in addition to its position relative to the TCR HMD device 120 by using CPD measurements in addition to the single Tx/Rx measurements.

Using an IMU on the TCR Controller device 110 or optionally using an IMU on the TCR HMD device 120 improves position and orientation/attitude tracking through aiding the fusion filter and TCR carrier phase measurement unwrap.

Performance drivers of illustrative embodiments presented herein are TCR sensor measurement accuracy, successful unwrap of carrier phase measurements (CPR, CPD), and accurate time synchronization of IMU and TCR data. Generally, TCR data is of good quality in normal RF environmental conditions. However, in poor RF environmental conditions, the individual TCR measurements can become degraded. The biggest challenge to performance for the illustrative embodiments presented herein is the failure to properly unwrap CPR and/or CPD measurements due to degraded TCR measurement quality. TCR measurement unwrap errors can degrade system performance by introducing correlated errors into the EKF. Some of the complexity of the signal processing presented below is used for identifying and correcting unwrap issues in CPR and/or CPD.

I.A. Sensor and Hardware Design Parameters

I.A.1. Controller Device Sensors

Figure 4:
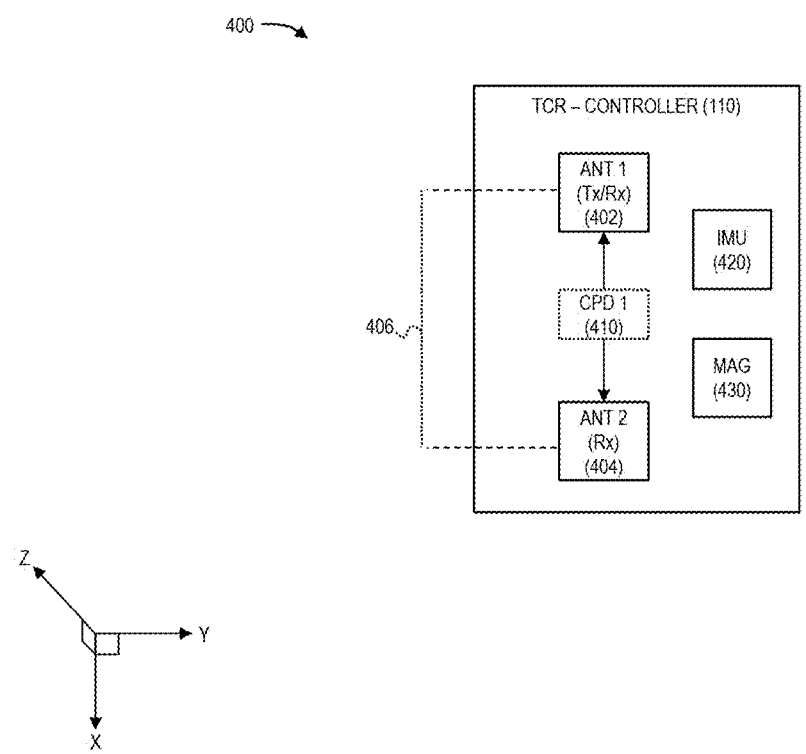
FIG. 4 illustrates a schematic diagram of one illustrative embodiment of sensor hardware on a TCR Controller device.

FIG. 4 illustrates a schematic diagram 400 of one illustrative embodiment of sensor hardware on the TCR Controller device 110. The TCR Controller device 110 may include a pair of antennae having a first Tx/Rx antenna 402, and a second Rx antenna 404. A single Tx/Rx channel, (e.g., the first antenna 402), may also be used without significant impact to the system positioning performance. Additional Rx channels and antennae may be used to improve system performance. The antennae also may be spaced apart from each other by an antennae baseline distance 406 of sufficient length to determine the TCR CPD measurement as described below. For example, in one illustrative embodiment, the antennae baseline distance 406 may be approximately 5 cm for a hand-held TCR Controller device 110. The antennae baseline distance 406 may be modified accordingly based on the size of the TCR Controller device 110 and the desired accuracy of the six-degrees of freedom measurements with respect to the TCR HMD device 120. Furthermore, the antennae baseline distance 406 may be tied to a range between 0.1 to 100 times of a radio frequency wavelength used in RF communication between the TCR devices.

The TCR Controller device 110 may also include an IMU 420 and magnetometer 430 for providing raw data observables to determine orientation/attitude with respect to the TCR HMD device 120 as described below.

I.A.2. HMD Device Sensors

Figure 5:
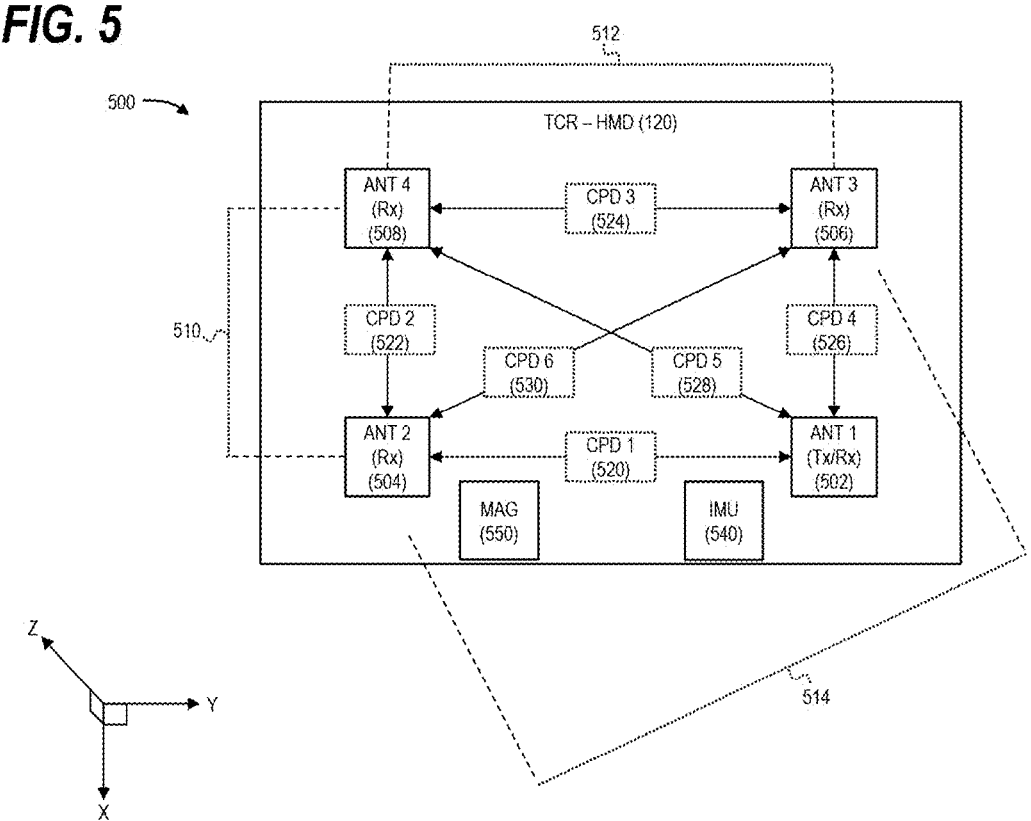
FIG. 5 illustrates a schematic diagram of one illustrative embodiment of sensor hardware on a TCR HMD device.

FIG. 5 illustrates a schematic diagram 500 of one illustrative embodiment of sensor hardware on the TCR HMD device 120. The TCR HMD device 120 may include four antennae: a first Tx/Rx antenna 502, and a second Rx antenna 504, a third Rx antenna 506 and a fourth antenna 508. Additional Rx channels and antennae may be used to improve system performance. Generally, one antenna, the "primary", may be a Tx/Rx channel. All other channels may be Rx only. The illustrated four antennas may be used to over-constrain the 3-D position of the Controller(s) device 100 in the current system. Fewer antennas may be used if additional aiding sensors are available, or only if 2-D tracking is desired. More than four antennas on the TCR HMD device 120 may also be utilized to improve the accuracy or robustness of the system.

The antennae also may be spaced apart from each other by antennae baseline distances of sufficient length to determine the TCR CPD measurement as described below. For example, in one illustrative embodiment, a first antenna baseline distance 510, (measured between first Tx/Rx antenna 502 and third Rx antenna 506 pair, and between second Rx antenna 504 and fourth Rx antenna 508 pair), may be approximately 5 cm for the TCR HMD device 120. A second antennae baseline distance 512 (measured between first Tx/Rx antenna 502 and second Rx antenna 504 pair, and between third Rx antenna 506 and fourth Rx antenna 508 pair), may be approximately 10 cm for the TCR HMD device 120. A third antennae baseline distance 514 (measured between first Tx/Rx antenna 502 and fourth Rx antenna 508 pair, and between second Rx antenna 504 and third Rx antenna 506 pair), may be approximately 11 cm for the TCR HMD device 120. These antennae baseline distances 510, 512 and 514 may be modified accordingly based on the size of the TCR HMD device 120 and the desired accuracy of the six-degrees of freedom measurements with respect to the TCR Controller device 110 and applications for which the system is intended. Furthermore, the antennae baseline distances 510, 512 and 514 may be tied to a range between 0.1 to 100 times of a radio frequency wavelength used in RF communication between the TCR devices.

The current TCR HMD device 120 hardware may include four antennae with known characteristics in a fixed, known geometric configuration. The physical relationship, particularly the baseline distances between all antennae pairs must be well known for proper utilization of TCR CPD measurements. For example, given the above described first 510, second 512 and third 514 antennae baseline distances, CPD calculations may be made for each of the antenna pairs illustrated in FIG. 5 based on these antennae baseline distances. For example, a first logical CPD 520 may be calculated based on RF signals received between first Tx/Rx antenna 502 and second Rx antenna 504 pair having the second antennae baseline distance 512. A second logical CPD 522 may be calculated based on RF signals received between second Rx antenna 504 and fourth Rx antenna 508 pair having the first antennae baseline distance 510. A third logical CPD 524 may be calculated based on RF signals received between third Rx antenna 506 and fourth Rx antenna 508 pair having the second antennae baseline distance 512. A fourth logical CPD 526 may be calculated based on RF signals received between first Rx antenna 502 and third Rx antenna 506 pair having the first antennae baseline distance 510. A fifth logical CPD 528 may be calculated based on RF signals received between first Rx antenna 502 and fourth Rx antenna 508 pair having the third antennae baseline distance 514 And a sixth logical CPD 530 may be calculated based on RF signals received between second Rx antenna 504 and third Rx antenna 506 pair having the third antennae baseline distance 514.

The TCR HMD device 120 may also include an IMU 540 and magnetometer 550 similar to the TCR Controller device 110 for providing raw data observables to determine orientation/attitude with respect to another external TCR device as further described below.

I.A.3. Antennae Characteristics for Both the HMD and Controller

Although the antenna illustrative embodiments presented herein may work with any antenna or antenna system designs to enable the core TCR sensor measurements, particular antenna designs may impact the accuracy of the measurements and the ability to cleanly unwrap the carrier phase measurement data. An effort was made to optimize the antennae configuration resulting in two different antenna systems. Both antenna system designs featured a wide field-of-view and were well-matched to the TCR RF transmission frequency. The field of view was optimized to maintain a high signal-to-noise over as wide a range of TCR Controller device 110 positions as possible, and the antenna element load impedance was matched to the source and transmission line impedance of the RF circuitry of the TCR device.

I.A.3.i. Separation of Antennae

Figure 6:
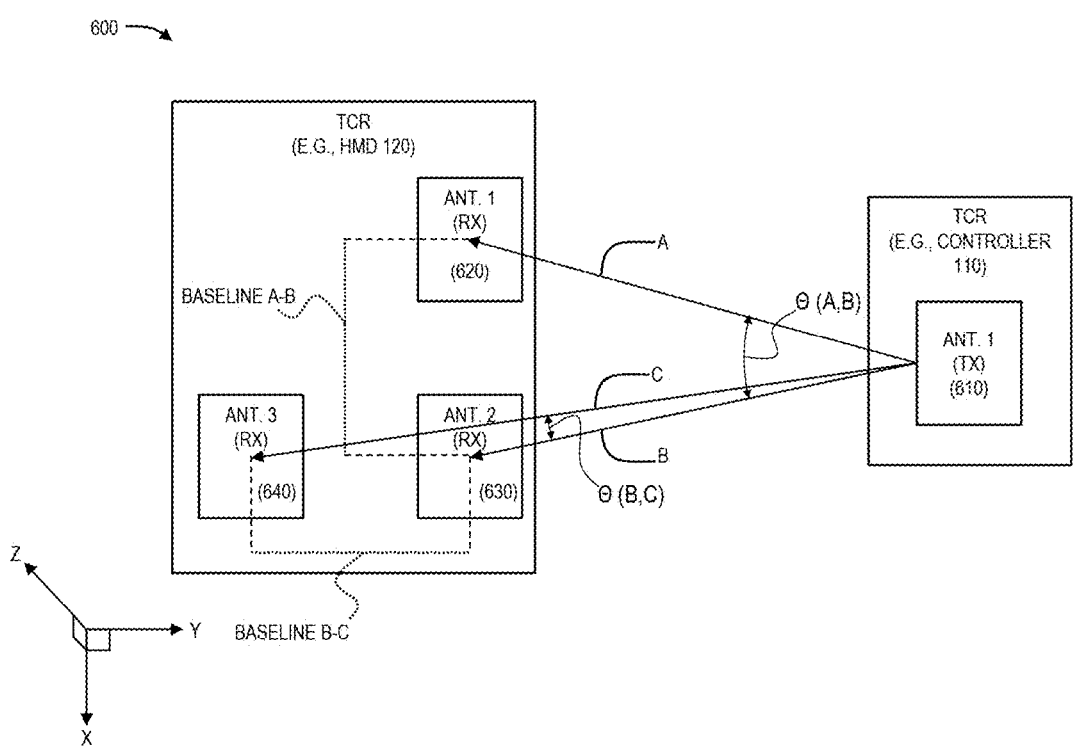
FIG. 6 illustrates a schematic antennae diagram used to calculate Carrier Phase Difference (CPD)

When properly unwrapped and bias corrected, CPD can be used to calculate the angle between a first line A defined between a transmitting antenna 610 and first receiving antenna 620 pair, and a second line B defined between the same transmitting antenna 610 and a second receiving antenna 630 pair, (e.g., given Tx antenna 610 of TCR device 110, and Rx antennae 620 and 630 of the TCR device 120), using simple geometry as shown the schematic antennae diagram 600 of FIG. 6 and the below equation.

Measured Variables:

Carrier Phase Difference (CPD)=[φ(B)−φ(A)]

(wherein φ is the carrier phase)

B=unwrapped Carrier Phase Range (CPR)

Constants:

Baseline A-B (between the phase centers of the two antennas performing the CPD measurement, i.e., antenna 620 and antenna 630)

Calculated Variables:

Carrier Phase Difference (CPD)

$$\text{Distance Difference} = [\varphi(B) - \varphi(A)]\left[\frac{\lambda}{2\pi}\right] = [B - A]$$

(wherein $\lambda$ is the carrier wavelength)

$$\theta(A, B) = \cos^{-1}\left(\frac{CPD}{\text{baseline } A-B} + \frac{\text{baseline } A-B}{2*B} - \frac{CPD^2}{2*B*\text{baseline } A-B}\right),$$

or $$\theta(A, B) \approx \cos^{-1}\left(\frac{CPD}{\text{baseline } A-B}\right), \text{ when } B \gg \text{baseline } A-B.$$

A second angular measurement may be made between the second line B defined between the transmitting antenna 610 and the second receiving antenna 630 pair, and a third line C defined between the same transmitting antenna 610 and a third receiving antenna 640 pair, (e.g., given Tx antenna 610 of TCR device 110, and Rx antennae 630 and 640 of the TCR device 120), further using simple geometry as shown in FIG. 6 and the below equation.

Measured Variables:
Carrier Phase Difference (CPD)=[φ(B)−φ(C)]
B=unwrapped Carrier Phase Range (CPR)
Constants:
Baseline B-C (between the phase centers of the two antennas performing the CPD measurement, i.e., antenna 630 and antenna 640)
Calculated Variables:

Carrier Phase Difference (CPD)

$$\text{Distance Difference} = [\varphi(B) - \varphi(C)]\left[\frac{\lambda}{2\pi}\right] = [B - C]$$

$$\theta(B, C) = \cos^{-1}\left(\frac{CPD}{\text{baseline } B-C} + \frac{\text{baseline } B-C}{2*B} - \frac{CPD^2}{2*B*\text{baseline } B-C}\right),$$

or $$\theta(B, C) \approx \cos^{-1}\left(\frac{CPD}{\text{baseline } B-C}\right), \text{ when } B \gg \text{baseline } B-C.$$

The primary design variable that drives the accuracy of the computed angle, (e.g., θ(A,B) and θ(B,C) is the "baseline" distance between the phase centers of the two antennas performing the CPD measurement. As the baseline increases, the accuracy of the angle increases. The TCR HMD device 120 angle(s) estimated from this calculation can be used to solve for the TCR Controller device 110 position by estimating the intersection of multiple bearings in different coordinate planes (XY, YZ and XZ) of the TCR HMD device 120. Alternatively, the direct measurement of CPD can also be consumed as an aiding measurement as part of the larger position and orientation tracking filter.

I.A.3.ii. Number of Antennae

With a minimum of three antennae on the TCR HMD device 120, enough information is available to estimate the 3-D position of the TCR Controller device 110 with respect to the TCR HMD device 120. By using four or more antennas, an overdetermined solution may be determined to estimate the 3-D position of the Controller device 120. The extra information resulting from the additional antenna(s) is desirable during an initialization procedure when a simultaneous estimate of the initial 3-D position and the initial integer ambiguity in CPR is needed. Also, the extra CPD measurement from an additional (fourth) antenna may be used for evaluating the internal consistency of the determined 3-D position based on the other remaining (three) antennas, which may assist in filtering out any "bad" CPD measurements.

The illustrative embodiments presented herein may utilize additional antennae on the Controller device(s) 110 to constrain TCR Controller device 110 angular orientation and position relative to the TCR HMD device 120. The illustrative embodiment presented herein illustrates two antennas on the TCR Controller device 110, (resulting in one CPD calculation between each pair of antennae), primarily to aid in TCR Controller device 110 angular orientation/attitude estimation. Adding additional antennae may improve position and angular orientation accuracy and computational robustness by further constraining those solutions, as well as offering improved antenna geometric dilution of precision (GDOP).

I.A.3.iii. Configuration of Antennae (Baseline)

Practically, it is desirable to maximize the distance, or baseline, between antennae on the TCR HMD device 120 to achieve higher accuracy angle estimates and to have at least four antennae for the reasons described above. To maximize the angle accuracy, the four antennas were placed on the four corners of the top XY plane of the TCR HMD device 120 as illustrated in FIG. 5.

Similarly, the two antennae on the TCR Controller device 110 are placed at a largest baseline separation distance on the top XY plane given the TCR Controller device 110 size as illustrated in FIG. 4.

For applications that require high accuracy and longer distances between the TCR HMD device 120 and TCR Controller device 110, larger baselines distances would enable this. Baseline choice must also be balanced against the need to unwrap CPD measurements—larger baselines mean more possible integer ambiguities for a given CPD measurement, and a smaller angular resolution between CPD integers.

I.B. TCR Measurements

The TCR measurements made on the TCR HMD device 120 and TCR Controller device 110 are made via one-way and two-way RF transactions between corresponding "TCR devices". For example, in FIG. 1 an TCR Originator 100 broadcasts a preamble and data payload 130 which a TCR Transponder 110 observes, receives, and processes. The TCR Transponder 110 then responds with its own preamble and data payload 140 containing data products from its observations on the original transmission from the TCR Originator 100 and other data products. The TCR Originator 100 observes and receives TCR Transponder 110 transmission 140, makes its own data products from its observations, and reports the following measurements:

Baseband Range—A baseband code phase measurement of round-trip RF time-of-flight (TOF), which represents the relative distance between transacting TCR devices;

Carrier Phase Range (CPR)—A carrier phase measurement of the relative distance between transacting TCR devices;

Carrier Phase Velocity (CPV)—A carrier phase measurement of Doppler velocity, which represents the relative speed between transacting TCR devices;

Carrier Phase Difference (CPD)—A carrier phase measurement of the interferometric Phase Difference of Arrival (PDoA) of a signal received on multiple coherent receive channels of a TCR device. This phase difference can be further expressed as a Time Difference of Arrival (TDoA) or a distance difference;

Transactional Difference Range (TDR)—A baseband code phase measurement of time difference of arrival as received on a passive observer TCR, where the observing TCR builds a TDR measurement from receiving and processing the Originator and Transponder transmissions of transacting TCRs; and Wireless clock frequency, clock phase, and time synchronization—Fundamental TCR observables are used to measure and correct for frequency and phase offsets of remote clocks to achieve a synchronized network time and/or clock frequency and/or phase across transacting TCRs.

The illustrative embodiments presented herein utilizes the TCR measurements, most notably CPD, CPR, CPV, and wireless synchronization, in conjunction with a cell phone class, commercial inertial measurement unit (IMU) (e.g., the Bosch® Sensortec™ BMI160), also typically including an accelerometer to detect linear motion and gravitation forces, and a gyroscope that measures the rate of rotation in 3-D space, i.e., roll, pitch and yaw.

I.B.1. Carrier Phase Difference (CPD)

CPD is the backbone of the TCR data processing of the illustrative embodiments presented herein. Regarding the TCR HMD device 120 as illustrated in FIG. 5, six CPDs, (CPD1 520, CPD2 522, CPD3 524, CPD4 526, CPD5 528, and CPD6 530), logically placed between the receiving antenna signal path of each pair of antennae on the TCR HMD device 120 over constrain the 3-D position of the TCR Controller device 110 and are primarily responsible for the accuracy and robustness of the position and orientation determine system 100 positioning performance.

Regarding the TCR Controller device 110, as illustrated in FIG. 4, a single CPD, (CPD1 410), is logically placed between the receiving antenna signal path of the pair of antennae on the TCR Controller device 110 to constrain the attitude of the TCR Controller device 110, most notably the yaw. This is especially valuable since the yaw axis (Z-axis) is not constrained by the gravity vector when the TCR Controller device 110 is held in a neutral position (i.e., when the TCR Controller device 110 antennae (e.g., ANT1 402 and ANT2 404), and IMU 420 are in an upward facing direction).

CPD is a carrier phase measurement of distance difference with an integer ambiguity. CPD unwrap challenges occur relatively frequently in challenging environments but can be identified and corrected using the other TCR/IMU observations. Properly initializing and tracking CPD integer ambiguities is relevant to using CPD data in the six-degrees of freedom sensor fusion. CPD integer ambiguity estimation and tracking is simplified somewhat by the significant position jump an incorrect ambiguity implies. For example, if two possible integer ambiguities would computationally place the TCR Controller device 110 either to the left at 45° or the right at 45° of the TCR HMD device 120, a previous position of the Controller device's 110 position should enable proper integer ambiguity resolution by eliminating the least probably position option.

When properly unwrapped and bias corrected, CPD can be used to calculate the angle, by the above defined equations, between the line defined by the receiving antennae and the line defined by the receiving antenna and one of the transmitting antennae using simple geometry as defined above.

Figure 7:
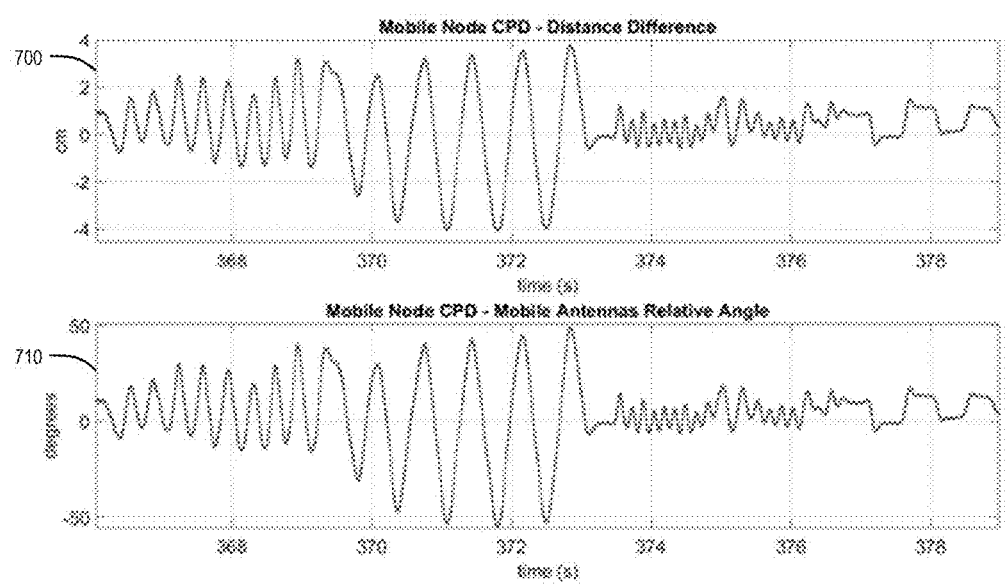
FIG. 7 illustrates example CPD data with both a Distance Difference and a Mobile Antennae Relative Angle.

FIG. 7 illustrates example CPD data with both a Distance Difference 700 and a Mobile Antennae Relative Angle 710. The TCR HMD device 120 angle(s) estimated from the above-identified CPD calculation can be used to solve for the TCR Controller device 110 position by estimating the intersection of multiple bearings in different planes (i.e., XY, YZ and XZ planes). The estimated angle(s) or the direct measurement of CPD can also be consumed as part of the larger position and attitude tracking filter.

I.B.2. Carrier Phase Range (CPR)

Figure 8:
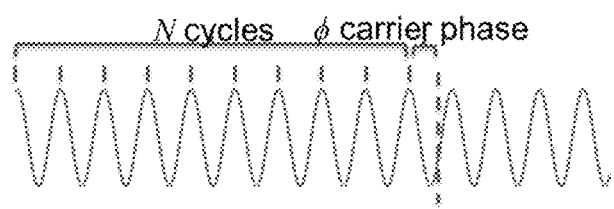
FIG. 8 illustrates a carrier frequency for Carrier Phase Range determination.

CPR constrains the distance between the TCR HMD device 120 and TCR Controller device 110 to better than millimeter accuracy and precision based on the measure of the range between a transmitter and receiver expressed in units of cycles of the carrier frequency. See carrier frequency illustration 800 in FIG. 8. This CPR measurement can be made with very high precision (of the order of millimeters), but the whole number of cycles between transmitter and receiver is typically not measurable. CPR allows for the measurement of the range between corresponding TCR devices very precisely with an ambiguity in the number of whole carrier cycles.

CPR integer ambiguity can be initialized and tracked via one or more of the following methods: 1) known or externally measured initial positions or distance between TCR HMD device 120 and TCR Controller device 110; 2) estimation of relative position of TCR Controller device 110 relative to TCR HMD device 120 using CPD measurements; and 3) estimation of relative distance for TCR Controller device 110 relative to TCR HMD device 120 using Baseband Ranging. The illustrative embodiments disclosed herein typically use approach 2). Approach 3) has also been used for applications where the distance between TCR Controller device 110 and TCR HMD device 120 is larger.

Once the initial ambiguity is known, raw CPR measurements are "unwrapped" using some combination of: 1) CPV—directly measured estimate of change in CPR since last measurement; 2) ΔCPR—first difference of last two unwrapped CPR samples, or some windowed and/or smoothed estimate of average change in recent CPR; 3) inertially or filter output derived expected CPR; and 4) expected CPR from CPD derived positioning.

The integer ambiguity initialization methods can also be used throughout the operation to check the validity of the current CPR integer ambiguity estimate, flag bad data, and potentially correct or re-initialize the CPR integer estimate.

I.B.3. Carrier Phase Velocity (CPV)

CPV is primarily used to aid in CPR unwrap, since the current CPV observation can provide an independent measurement of the expected CPR, assuming sufficiently fast sampling. CPV can also be used directly in the EKF to aid in CPR unwrapping errors but may be of limited value if CPR is available and being unwrapped properly.

I.B.4. Transactional Difference Range (TDR)

TDR measurements may be leveraged as an additional aid for measuring illustrative embodiments utilizing multiple Controller devices 120 or multiple user setups comprising multiple TCR HMD device 120 and TCR Controller device 110 pairings.

I.B.5. Time, Frequency, and Phase Synchronization

The TCR time sync capability may be used to synchronize the time scales of the TCR HMD device 120 and Controller device(s) 110 to eliminate time sync errors that would drive position/orientation errors in a final system. By synchronizing time wirelessly between corresponding TCR devices to a nanosecond level, the tracking accuracy of the system may be improved.

I.B.6. Baseband Range

Baseband ranging can be used to help constrain CPR integer ambiguities. Baseband ranging may also be used as a positioning aide for alternative applications where the distance between TCR HMD device 120 and TCR Controller device 110 is 10 meters or greater.

I.C. Sensor Fusion

Generally, the illustrative embodiments described herein may be suitable for estimating full six-degrees of freedom position and orientation/attitude estimation, or any subset of that six-degrees of freedom. At a minimum, to achieve six-degrees of freedom tracking, two things must be estimated: 1) the position of the TCR Controller device 110 relative to the TCR HMD device 120; and 2) the angular orientation of the TCR Controller device 110 relative to the coordinate frame (XY, YZ, XZ) of the TCR HMD device 120.

In order to relate the coordinate frame of the TCR Controller device 110 and TCR HMD device 120, the HMD device's 120 orientation and position must be known, measured, estimated, or remain fixed relative to the local level frame. The relative position and angular orientation of the TCR Controller device 110 can be estimated separately or in a single fusion method. The minimum set of measurements necessary to estimate both is presented below, along with the relative benefits of additional measurements or sensor fusion techniques.

I.C.1. Positioning

The 3-D position of the TCR Controller device 110 relative to the TCR HMD device 120 can be calculated directly from the distance between them, and two of the three angles of the TCR HMD device 120 coordinate frame (i.e., planes XY, XZ and YZ). This is simply measuring the position via distance and bearing from a known position. The TCR measurements of CPD from three antennae and CPR, unwrapped, can be used to calculate the distance and angles, (as described above). Additional CPD measurements and antennae can be used to over constrain and improve the positioning solution. Additional TCR measurements, (e.g., Baseband Range, CPV, TDR), may optionally be used to further aid the positioning solution.

The addition of inertial sensing on the TCR Controller device 110 provides sensing of incremental rotations and accelerations that further improve the robustness and accuracy of the TCR Controller device 110 positioning estimate. Inertial navigation also provides holdover performance during periods of TCR measurement outage or degradation due to occlusion or environmental effects. The TCR measurements and IMU heuristic updates constrain and improve estimation of changing inertial sensor errors, which improves the accuracy and utility of the inertial sensing.

I.C.2. Orientation

The IMU is the primary sensor for estimating the orientation of the TCR Controller device 110 in its coordinate frame. Much of the orientation estimation involves estimating the direction of the gravity vector, which constrains 2 of 3 axes. Orientation estimation is accomplished through the fusion of all measurements that provide observability to TCR Controller device 110 orientation, which is primarily the IMU, position estimate, and TCR Controller device 110 CPD. Magnetic heading on the TCR Controller device 110 could also be used as a further constraint.

I.C.3. Signal Processing

Figure 9:
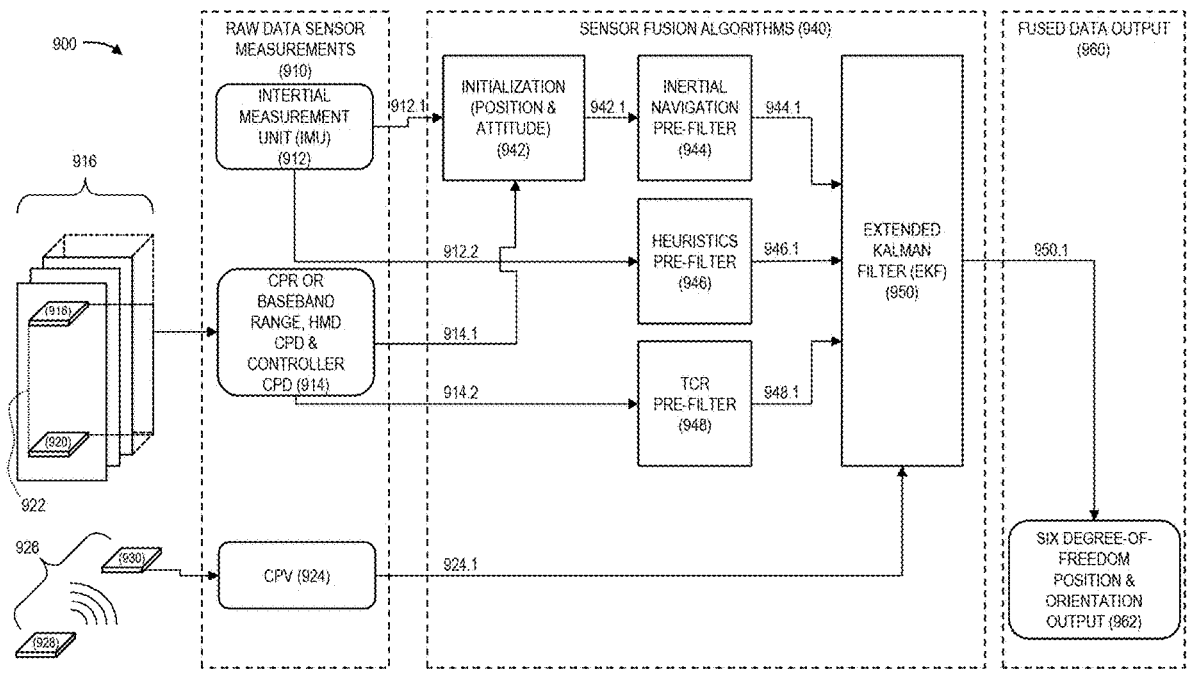
FIG. 9 illustrates a signal processing schematic diagram representing signal paths of raw data observable measurements and their corresponding processing via sensor fusion algorithms into a fused data output.

FIG. 9 illustrates a signal processing schematic diagram 900 representing signal paths of raw data observable measurements 910 and their corresponding processing via sensor fusion algorithms 940 into a fused data output 960. Software for sensor fusion for the illustrative embodiments described herein may occur on an embedded processor, digital signal processor (DSP), field programmable gate array (FPGA), or application-specific integrated circuit (ASIC) that is present on the TCR Controller device 110, TCR HMD device 120, and/or an external host PC or computing device. Fusion algorithms currently implemented utilize significant data prefiltering with an EKF, but numerous other options exist for data fusion. The fusion algorithms and associated preprocessing are represented in the dashed box entitled sensor fusion algorithms 940.

The core processing consists of integrating raw data observable measurements and heuristic measurements derived from data supplied by the IMU 912 in an EKF 950 to estimate and correct errors in the position, velocity, attitude and sensor errors of the IMU 912 based on conventional inertial navigation. Specifically, EKF 940 state errors consist of three position errors, three velocity errors, three attitude errors, three accelerometer bias errors and three gyro bias errors, each being associated with X, Y and Z axes, respectively.

I.C.3.i. Raw Data Sensor Observable Measurements

Raw data sensor observable measurements 910 at either the TCR Controller device 110 and/or the TCR HMD device 120 may be taken from three sources: an IMU 912, TCR antenna(e) providing CPR and CPD measurements 914, and TCR antenna(e) providing CPV measurements 924.

The IMU 912 provides IMU data 912.1 to initialization algorithm 942 and the same IMU data 912.2 to heuristics pre-filter algorithm 946.

CPR or Baseband Range, HMD CPD & Controller CPD 914 logic element obtains CPR and CPD observable data from antenna signals on the TCR Controller device 110 and/or TCR HMD device 120. Particularly, CPD observable data is collected from discrete CPD antenna pairs 916, for example, represented by a first antenna 918 and a second corresponding antenna 920 of a CPD antenna pair 916. Antennae baseline distance 922 between each corresponding antennae pair 918, 920 is also collected to be used to calculate the CPD observable data. CPR/CPD data 924.1 may be sent to initialization algorithm 942 of position and orientation/attitude and the same CPR/CPD data 914.2 may be sent to the TCR pre-filter algorithm 948.

CPV observable data 924 may be collected from a CPV antenna pair 926 defined by a first antenna 928 of CPV antenna pair 928 being on one of the TCR devices (e.g., a TCR Controller device 110), and a second corresponding antenna 930 of CPV antenna pair 930 being on the other corresponding TCR device, (e.g., a TCR HMD device 120). CPV data 924.1 may be sent directly to the EKF algorithm 950 of the sensor fusion algorithms 940.

I.C.3.ii. Initialization

Initialization algorithm 942 of position and orientation/attitude, as stated above, receives the IMU output 912.1 of IMU 912 and the CPR/CPD output 914.1 of CPR, HMD device CPD and Controller device CPD 914. Initialization data 942.1 is subsequently output to the inertial navigation algorithm 944.1 described in more detail below.

There are 23 parameters that may be processed by the initialization algorithm 942: nine parameters describing the position, velocity and attitude of the IMU in the TCR Controller device 110; six IMU sensor biases; seven CPD integer ambiguities; and one CPR integer ambiguity. The TCR Controller device 110 is initially stationary, so the velocity parameters may be set to zero. The roll and pitch attitude components are initialized based solely on conventional coarse alignment using the IMU data 912.1 to sense the direction of gravity, and the accelerometer biases are initialized based on the residual in the projected accelerometer measurements onto the known local gravity vector. The initial gyro biases are set to zero. This leaves twelve parameters to be initialized. As stated above, estimation of the CPD integer ambiguities is simplified by the significant position jump an incorrect ambiguity implies. The initial position is estimated based on minimizing the error in an iterative fit of the six TCR HMD device 120 CPD measurements and their possible integer ambiguities. Given this best position estimate, the CPR integer ambiguity is then estimated based on the expected CPR measurements for that best position estimate. Finally, the IMU heading is initialized based on the initial position and feasible TCR Controller device 110 CPD integer ambiguities during the first few measurements during motion.

I.C.3.iii. Inertial Navigation and Heuristic Pre-filters

Additional measurements to the EKF 950 are available based on the detection of any periods when the IMU 912 comes to rest by the inertial navigation pre-filter 944 where Zero Velocity Updates (ZUPTs) and Frozen Azimuth Updates (FRAZs) are detected based on empirically derived variance thresholds in the raw IMU data 912.1.

ZUPTs constrain the velocity to zero during periods when the IMU 912 is stationary. This update directly constrains the velocity errors but also constrains position errors, some components of the IMU bias errors and the roll and pitch misalignment errors relative to gravity through the associated state covariances. FRAZs constrain the change in the yaw of the IMU 912 to zero, which allows estimation and removal of the component of the gyro bias projected along the yaw-axis during stationary periods. Inertial navigation data 944.1 may be sent to the EKF 950 for further filtering based on CPV data 924.1.

Heuristics pre-filter algorithm 946 receives IMU data 912.2 from the IMU 912 and outputs heuristics pre-filter data 946.1 to the EKF 950.

I.C.3.iv. TCR Pre-filters

The TCR pre-filter algorithms 948 reject bad TCR data and provide tracking of CPR integer ambiguities and CPD integer ambiguities by utilizing algorithms similar to the initialization algorithms 942 processing.

CPD integer ambiguities are unwrapped using a raw measurement project/correct style filter, with outlier checking from the inertially derived position projection. Valid and robust unwrap of CPD is integral to system stability and performance. CPR integer ambiguities are unwrapped using a raw measurement project/correct style filter, with the projection being a combination of inertially derived projection and directly measured CPV. Outlier checking for the inertial and/or CPD derived position projection is also used. Valid and robust CPR unwrap is also important to system stability and performance.

TCR pre-filter data 948.1 is subsequently sent to the EKF 950 for further filtering based on CPV data 924.1.

I.C.3.v. Fusion EKF-Type Filter

As disclosed above, the specific TCR measurements are consumed directly by the fusion EKF filter 950. However, an alternate illustrative embodiment may fuse TCR observations into Distance and Angle-of-Arrival measurements, and fuse those estimates analytically or with a very simple filter for the TCR Controller device 110 position. Different sensor fusion algorithms could be applied to the same or similar sensor data. Further, an alternative RF illustrative embodiment or different sensor modality may replace some or all the TCR observations for a similar system and sensor fusion approach.

The use of a magnetometer in conjunction with the IMU 912 on the TCR Controller device 110 to constrain heading and position for heading estimation and potentially as a positioning aide may additionally aid in the sensor fusion. Furthermore, a similar sensor and fusion approach may be used for "Outside In" tracking with positioning infrastructure.

I.C.3.vi. Fused Data Output

EKF filter algorithm 950 outputs EKF filtered data 950.1 to provide a fused data output 960 comprising six-degrees of freedom position and orientation output 962. The fused data product is a causal position and attitude estimate that is capable of being computed in real-time or with a small, fixed lag from real-time.

Additional extensions possible from this approach include: 1) using known, measured, or tracked position and orientation of the TCR HMD device 120 in some other coordinate frame, such as Global Positioning System (GPS), to translate the TCR Controller device 110 and/or TCR HMD device 120 position into the GPS coordinate frame or a related frame; 2) extending tracking to additional Controller devices 110 or other tracked items, and 3) if hard real-time is not required, utilization of a windowed or full dataset smoothing algorithm to improve post processed results.

Alternative illustrative embodiments may provide using the above-identified inertial sensing and fusion filtering to also estimate an TCR HMD device 120 position/attitude in a local or global coordinate frame, as described below, in conjunction with the fused data output of the TCR Controller device 110.

II. System Operation

II.A. TCR Originator to TCR Transponder

Figure 10:
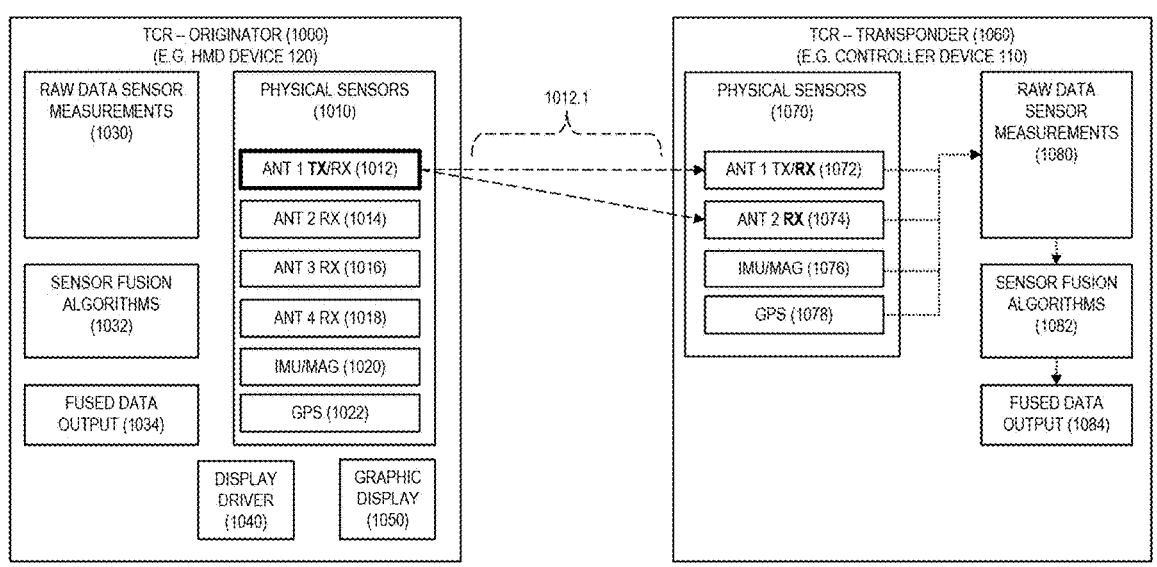
FIG. 10 illustrates a first communication sequence between corresponding TCR devices of the position and orientation determining system.
Figure 11:
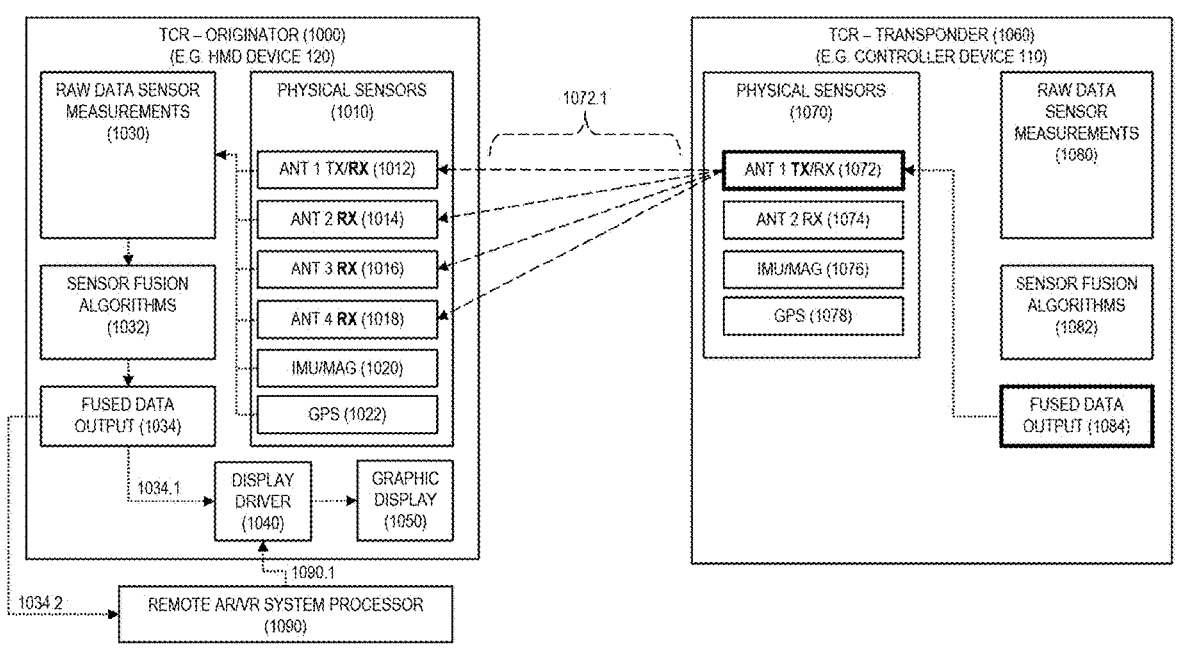
FIG. 11 illustrates a second subsequent communication sequence between corresponding TCR devices of the position and orientation determining system.

FIGS. 10 and 11 illustrate a communication sequence between corresponding TCR devices of the position and orientation determining system 100 as shown from FIG. 1 to FIG. 9.

FIG. 10 illustrates a first illustrative embodiment of a communication sequence originated by a TCR Originator device 1000, e.g., TCR HMD device 120, and a TCR Transponder device 1060, e.g., TCR Controller device 110. First, the TCR Originator device 1000 activates a transmitter antenna, e.g., ANT 1 TX/RX 1012, to transmit a preamble and a data payload via a carrier frequency at operation 1012.1 to the TCR Transponder 1060 for reception by any receiving antennae thereon, e.g., ANT 1 TX/RX 1072, and ANT 2 RX 1074.

Upon receiving the preamble and data payload from the TCR Originator 1000, the TCR Transponder 1060 forwards the antennae received preamble and data payload to the raw data observable measurements unit 1080 for calculation of CPR, CPD and CPV observable measurements in addition to IMU and/or magnetometer 1076 data, and GPS 1078 data. These data are then processed by the sensor fusion algorithms 1082, to produce baseband ranging data including master clock number counts, clock dynamic measurements and time-of-flight data, CPR data, CPV data, CPD data and orientation data based on the IMU/MAG device 1076. The data after passing through the EKF (e.g., EKF 950 in FIG. 9) is then output as fused data output 1084.

II.B. TCR Transponder to TCR Originator

FIG. 11 illustrates a second illustrative embodiment of a communication sequence where a TCR Transponder device 1060 responds to the communication received from the TCR Originator device 1000 of FIG. 10. The fused data output 1084 previously output by the sensor fusion algorithms 1082 is sent as a data payload with a TCR Transponder specific preamble to the transmitter antenna of the TCR Transponder, e.g., ANT 1 TX/RX 1072. The transmitting antenna transmits the TCR Transponder 1060 preamble and data payload 1072.1 to any receiving antennae of the TCR Originator device 1000, e.g., in this illustration, ANT1 to ANT4, designated by reference numbers 1012, 1014, 1016 and 1018.

The received signals at each of the respective antennae are forwarded to the raw data sensor observable measurements 1030 processor to calculate CPR, CPD and CPV solutions, in addition to IMU and/or magnetometer 1020 data, and/or GPS 1022 data. These data are then processed by the sensor fusion algorithms 1032, as described above with respect to FIG. 9, to produce baseband range measurements, CPR data and integer ambiguities, and CPD distance measurements, that, after processing by the EKF 950 of FIG. 9, is then output as fused data output 1034.

In a first illustrative embodiment, the fused data output 1034 at operation 1034.1 may be output to a display driver 1040 integral with the TCR Originator device 1000 to process graphic display information for presentation to a graphic display 1050 integrated with or for use in conjunction with the TCR Originator device 1000. The graphic display 1050 may be configured for a dual-eye head mounted micro-display device.

In a second alternative illustrative embodiment, the fused data output 1034 at operation 1034.2 may be output to a remote AR/VR system processor 1090 that may further process the fused data output 1034 and at operation 1090.1 and return data to the display driver 1040 of the TCR Originator device 1000 for presentation to the graphic display 1050. This illustrative embodiment may provide greater processing power to the fused data output 1034 than the TCR Originator device 1000 may be able to provide before rendering the graphics in an AR/VR environment on the graphic display 1050 of the TCR Originator device 1000.

II.C. HMD Device and Controller Device

Figure 12:
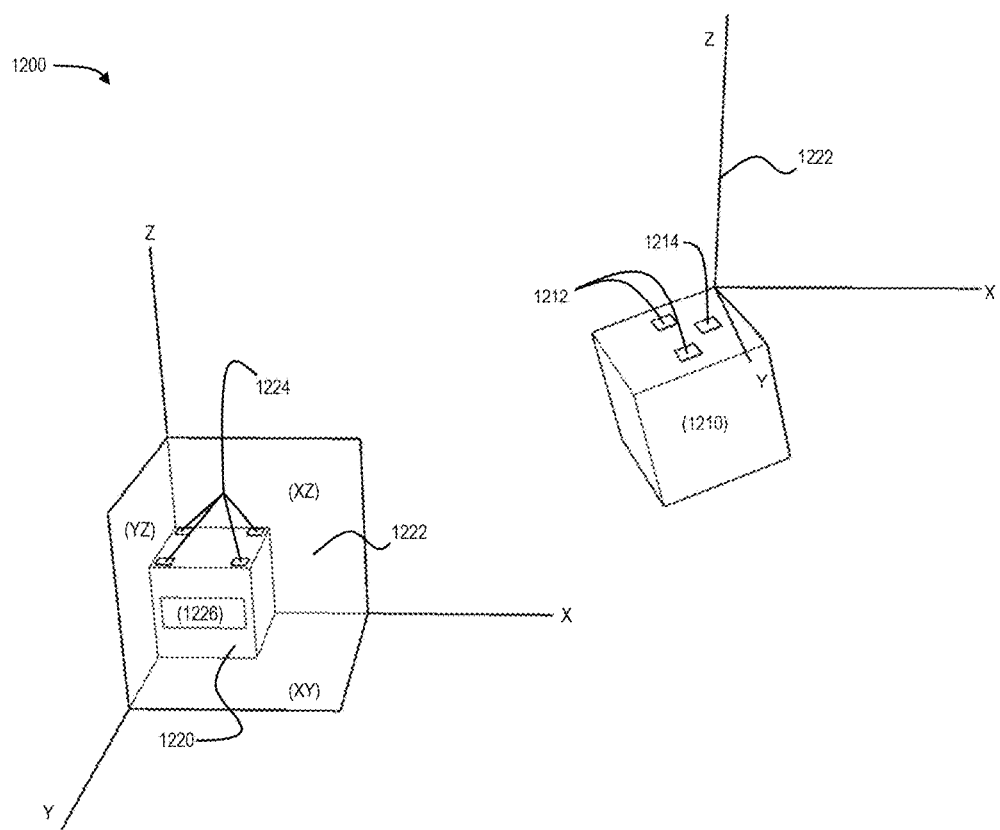
FIG. 12 illustrates a schematic diagram of one illustrative embodiment of a position and orientation determining system comprising a TCR Transponder device and a TCR Originator device, where a position and orientation of the TCR Transponder device is calculated relative to a reference frame of the TCR Originator device.

FIG. 12 illustrates a schematic diagram of one illustrative embodiment of a position and orientation determining system 1200 comprising a TCR Transponder device 1210 and a TCR Originator device 1220, where a position and orientation of the TCR Transponder device 1210 is calculated relative to a reference frame of the TCR Originator device 1220.

A TCR Transponder device 1210 comprises an antenna pair 1212 and IMU and/or magnetometer 1214 similar to the illustration in FIG. 4. A TCR Originator device 1220 comprises an antenna array 1224 similar to the illustration in FIG. 5 and a graphical display 1226. TCR Originator device 1220 additionally includes a TCR Originator coordinate frame 1222, having planes XY, YZ, and XZ to which the TCR Transponder device 1210 is oriented against.

Figure 13:
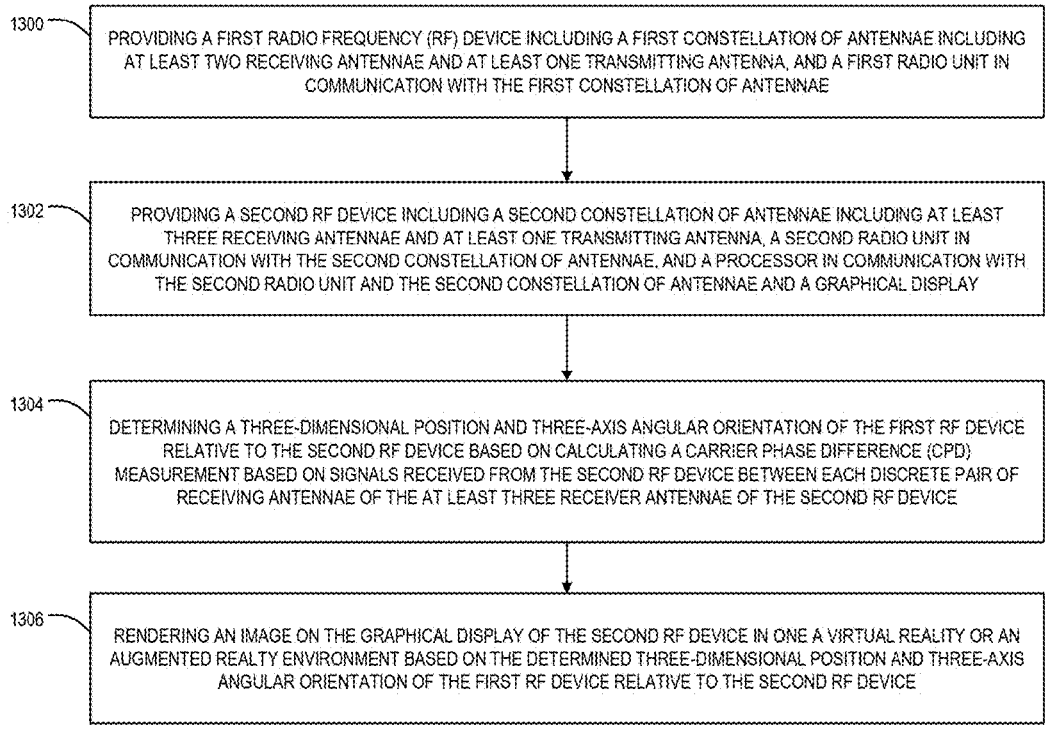
FIG. 13 illustrates a logic flowchart describing a method of determining a position and orientation of the TCR Transponder device relative to the TCR Originator device.

FIG. 13 further illustrates a logic flowchart describing a method of determining a position and orientation of the TCR Transponder device 1210 relative to the TCR Originator device 1220, where the method comprises providing 1300 a TCR radio frequency (RF) Transponder device 1210 including a first constellation of antennae 1212 including at least two receiving antennae and at least one transmitting antenna, a first radio unit in communication with the first constellation of antennae 1212.

The method further comprises 1302 providing a TCR RF Originator device 1220 including a second constellation of antennae 1224 including at least three receiving antennae and at least one transmitting antenna, a second radio unit in communication with the second constellation of antennae 1224, a processor in communication with the second radio unit and the second constellation of antennae 1224, and a graphical display 1226.

The method further comprises determining 1304 a three-dimensional position and three-axis angular orientation of the TCR RF Transponder device 1210 relative to the TCR RF Originator device 1220 based on calculating a carrier phase difference (CPD) measurement of phase difference based on signals received from the TCR RF Originator device 1220 between each discrete pair of receiving antennae of the at least three receiver antennae of the TCR RF device 1220.

The method further comprises rendering 1306 an image on the graphical display 1226 of the TCR RF Originator device 1220 in one a virtual reality or an augmented realty environment based on the determined three-dimensional position and three-axis angular orientation of the TCR RF Transponder device 1210 relative to the TCR RF Originator device 1220.

The method further comprises determining the three-dimensional position of the TCR RF Transponder device 1210 relative to the TCR RF Originator device 1220 based on unwrapped carrier phase range (CPR) samples.

The method further comprises determining the three-dimensional position of the TCR RF Transponder device 1210 relative to the TCR RF Originator device 1220 device by determining at least two of three angles of the TCR RF Transponder device 1210 relative to a coordinate frame (XY, XZ, YZ) of the TCR RF Originator device 1220 based on determining CPD measurement of phase difference by subtracting: 1) a first carrier phase range (CPR) determined distance between a transmitting antenna of the TCR RF Transponder device 1210 and a first receiving antenna of a pair of receiving antennae of the at least three receiver antennae of the TCR RF Originator device 1220, from 2) a second CPR determined distance between the transmitting antenna of the TCR RF Transponder device 1210 and a second receiving antenna of the pair of receiving antennae of at least three receiver antennae of the TCR RF Originator device 1220.

The method further includes where determining the three-dimensional position of the TCR RF Transponder device 1210 relative to the TCR RF Originator device 1220 by determining at least two of three angles of the TCR RF Transponder device 1210 relative to the coordinate frame 1222 of the TCR RF Originator device further comprises the method of calculating an angle of the TCR RF Transponder device 1210 relative to the coordinate frame 1222 of the TCR RF Originator device by determining a quotient of the determined CPD over a baseline distance between the pair of receiving antennae of the TCR RF Originator device.

The method further comprises providing each antenna of the TCR Transponder device 1210 and TCR Originator device 1220 constellations of antennae as circular polarized antennae.

The method further comprises providing the first constellation of antennae 1212 as one of linear polarized antennae or circular polarized antennae, and the second constellation of antennae 1224 as the other one of linear polarized antennae or circular polarized antennae.

II.D. HMD, Controller and AR/VR Controller

Figure 14:
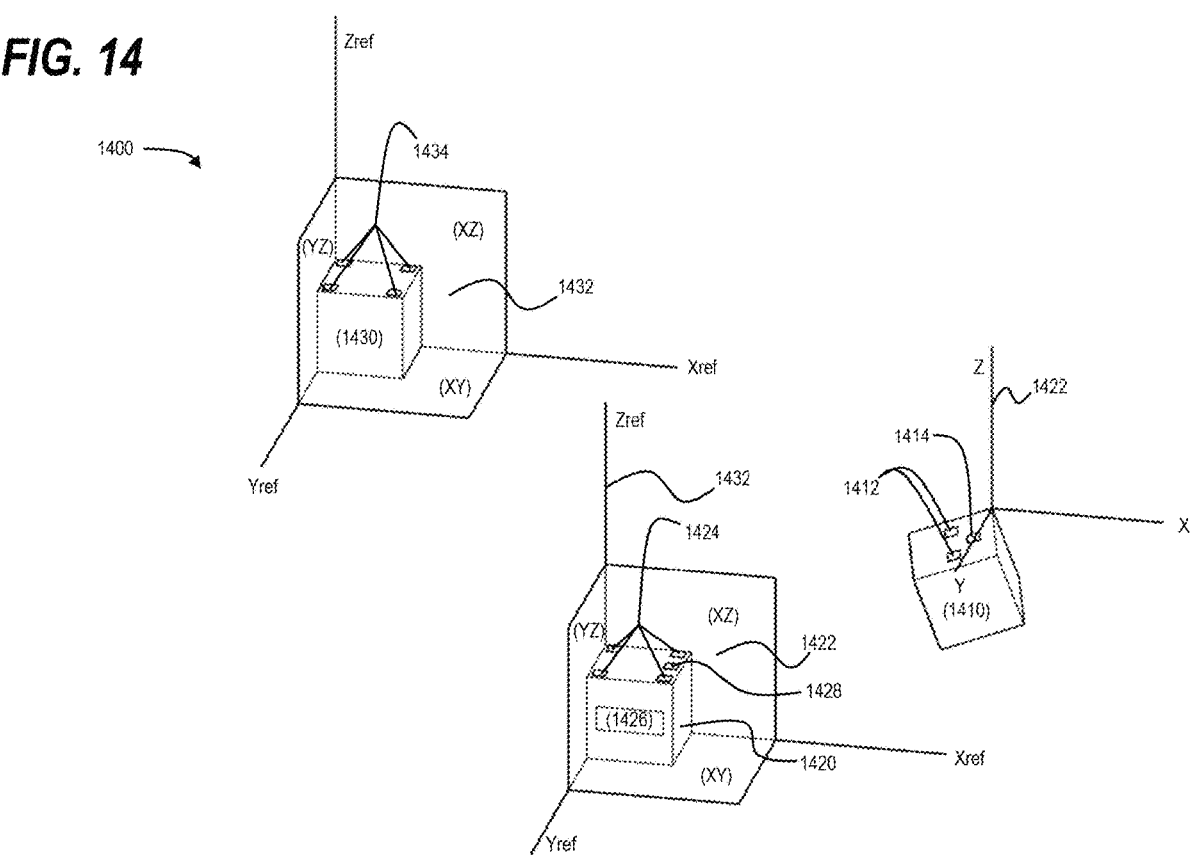
FIG. 14 illustrates a schematic diagram of another illustrative embodiment of a position and orientation determining system comprising a TCR Originator device, a TCR Transponder device and an external TCR processing device.

FIG. 14 illustrates a schematic diagram of another illustrative embodiment of a position and orientation determining system 1400 comprising a TCR Originator device 1410, a TCR Transponder device 1420 and an external TCR processing device 1430, where 1) a position and orientation of the TCR Transponder device 1420 is calculated relative to a reference frame of the TCR Originator device 1410, and 2) a position and orientation of the TCR Originator device 1410 is further determined relative to a reference frame of the external TCR processing device 1430.

A TCR Transponder 1410 comprises an antenna pair 1412 and IMU and/or magnetometer 1414 similar to the illustration in FIG. 4. A TCR Originator 1420 comprises an antenna array 1424 similar to the illustration in FIG. 5, a graphical display 1426 and an IMU and/or magnetometer 1428. TCR Originator 1420 additionally includes a TCR Originator coordinate frame 1422, having planes XY, YZ, and XZ to which the TCR Transponder 1410 is oriented against. A reference TCR 1430 includes a reference TCR coordinate frame having axes Xref, Yref and Zref, and a reference TCR antenna array 1434.

Figure 15:
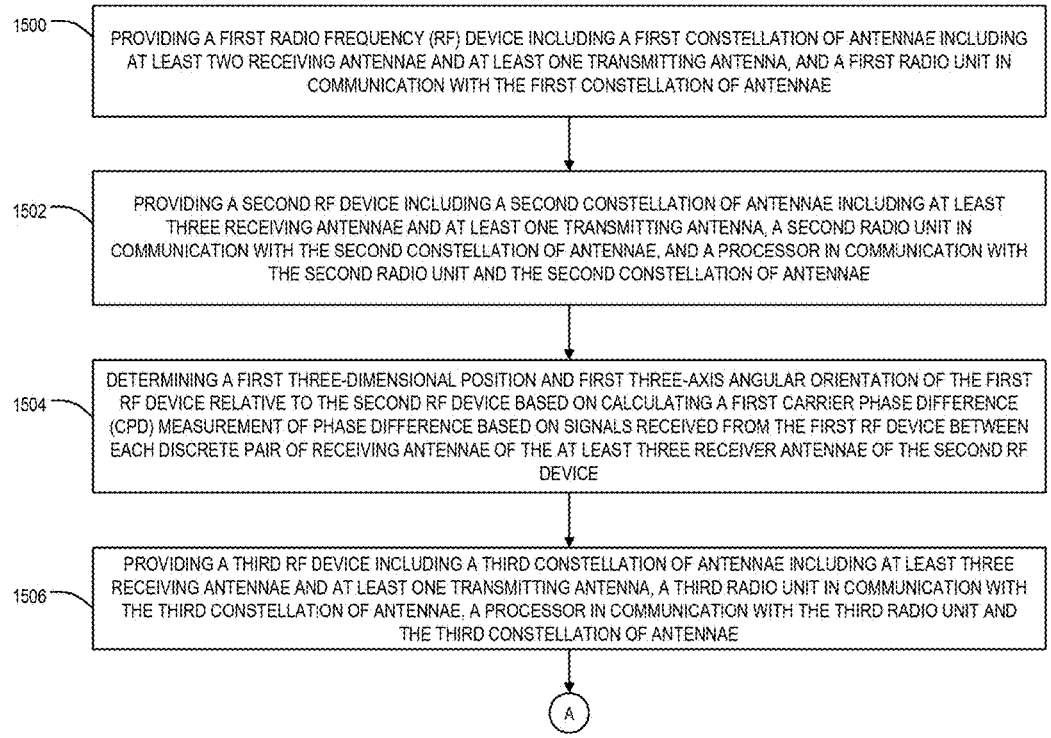
FIGS. 15-16 illustrate a logic flowchart describing method of determining a position and orientation of an object in accordance with the illustration of and corresponding description of FIG. 14.
Figure 16:
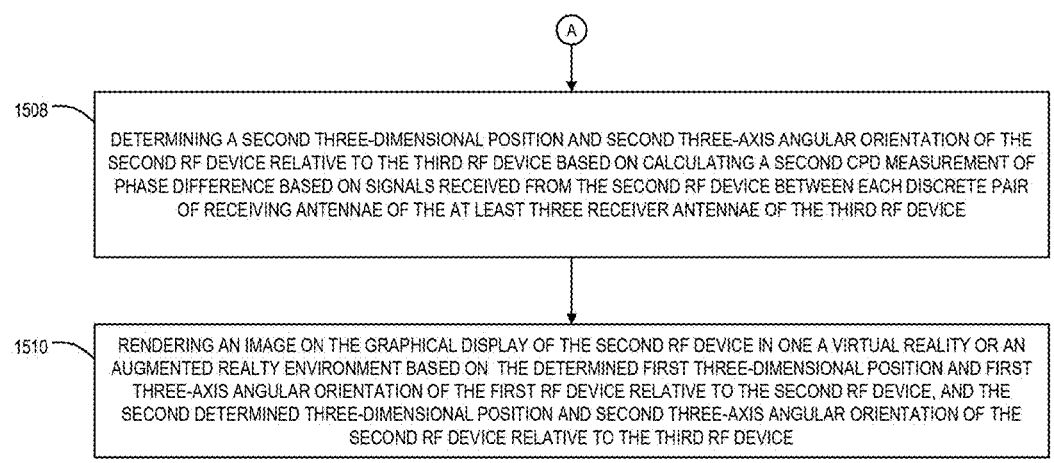

FIG. 15 and FIG. 16 further illustrate a logic flowchart describing method of determining a position and orientation of an object comprising providing 1500 a TCR radio frequency (RF) Originator device 1410 including a first constellation of antennae 1412 including at least two receiving antennae and at least one transmitting antenna, a first radio unit in communication with the first constellation of antennae 1412.

The method further comprises providing 1502 a TCR RF Originator device including a second constellation of antennae 1424 including at least three receiving antennae and at least one transmitting antenna, a second radio unit in communication with the second constellation of antennae 1424, a processor in communication with the second radio unit and the second constellation of antennae 1424, and a graphical display 1426.

The method further comprises determining 1504 a first three-dimensional position and first three-axis angular orientation of the TCR RF Transponder device relative to the TCR RF Originator device 1420 based on calculating a first carrier phase difference (CPD) measurement of phase difference based on signals received from the TCR RF Transponder device 1410 between each discrete pair of receiving antennae of the at least three receiver antennae of the TCR RF Origination 1420 device.

The method further comprises providing 1506 a reference TCR RF device 1430 including a third constellation of antennae 1434 including at least three receiving antennae and at least one transmitting antenna, a third radio unit in communication with the third constellation of antennae, a processor in communication with the third radio unit and the third constellation of antennae 1434.

The method further comprises determining 1508 a second three-dimensional position and second three-axis angular orientation of the TCR RF Origination device 1420 relative to the reference TCR RF device 1430 based on calculating a second CPD measurement of phase difference based on signals received from the TCR RF Origination device 1420 between each discrete pair of receiving antennae of the at least three receiver antennae of the reference TCR RF device 1430.

The method further comprises rendering 1510 an image on the graphical display 1426 of the TCR RF Origination device 1420 in one a virtual reality or an augmented realty environment based on the determined first three-dimensional position and first three-axis angular orientation of the TCR RF Transponder device 1410 relative to the TCR RF Origination device 1420, and the second determined three-dimensional position and second three-axis angular orientation of the TCR RF Origination device 1420 relative to the reference TCR RF device 1430.

The method further comprises determining the three-dimensional position of the TCR RF Transponder device 1410 relative to the TCR RF Origination device 1420 based on unwrapped carrier phase range (CPR) samples.

The method further comprises determining the three-dimensional position of the TCR RF Transponder device 1410 relative to the TCR RF Originator device 1420 by determining at least two of three angles of the TCR RF Transponder device relative to a coordinate frame (XY, XZ, YZ) of the TCR RF Originator device 1420 based on determining CPD measurement of phase difference by subtracting 1) a first carrier phase range (CPR) determined distance between a transmitting antenna of the TCR RF Transponder device and a first receiving antenna of a pair of receiving antennae of the at least three receiver antennae of the TCR RF Originator device 1420, from 2) a second CPR determined distance between the transmitting antenna of the TCR RF Transponder device 1410 and a second receiving antenna of the pair of receiving antennae of at least three receiver antennae of the TCR RF Originator device 1420.

The method of determining a position and orientation of an object wherein determining the three-dimensional position of the TCR RF Transponder device relative to the TCR RF Originator device 1420 by determining at least two of three angles of the TCR RF Transponder device 1410 relative to the coordinate frame of the TCR RF Originator device 1420 further comprises calculating an angle of the TCR RF Transponder device 1410 relative to the coordinate frame of the TCR RF Originator device 1420 by determining a quotient of the determined CPD over a baseline distance between the pair of receiving antennae of the TCR RF Originator device 1420.

The method further comprises providing each antenna of the first 1412 and second 1424 constellations of antennae as circular polarized antennae.

The method further comprises providing the first constellation of antennae 1412 as one of linear polarized antennae or circular polarized antennae, and the second constellation of antennae 1424 as the other one of linear polarized antennae or circular polarized antennae.

II.E. HMD, Controller and GPS Constellation

Figure 17:
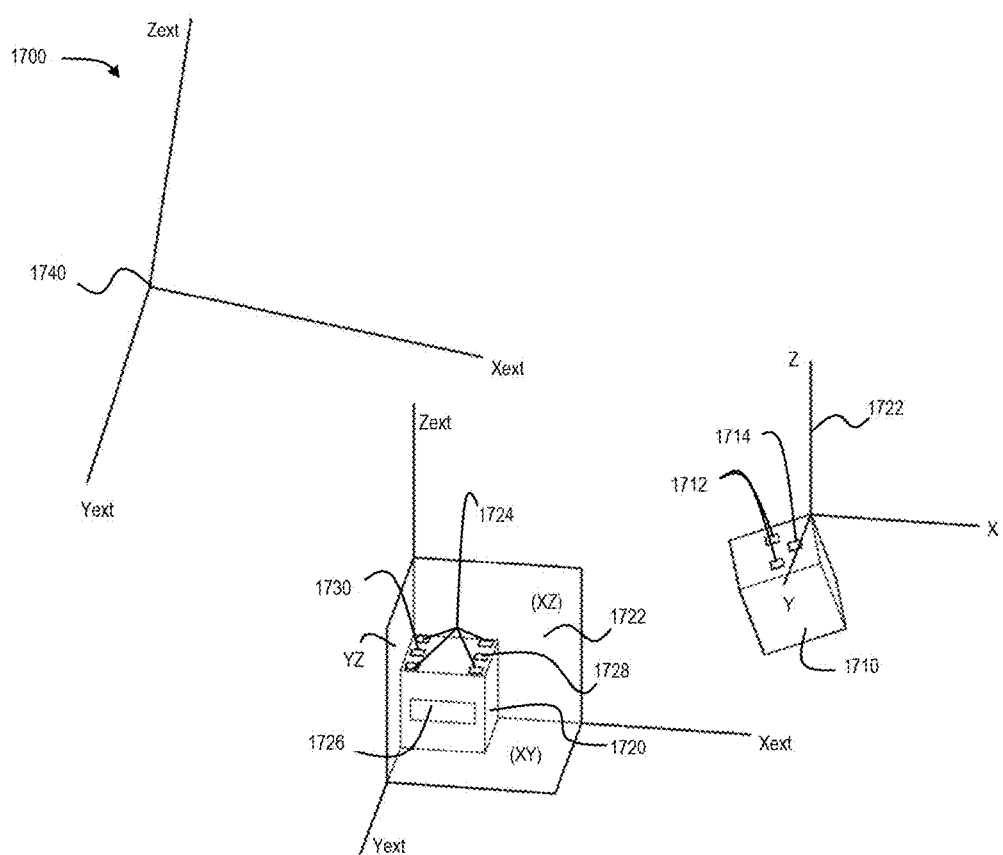
FIG. 17 illustrates a schematic diagram of another illustrative embodiment of a position and orientation determining system comprising a TCR Originator device, a TCR Transponder device and an external reference frame.

FIG. 17 illustrates a schematic diagram of another illustrative embodiment of a position and orientation determining system 1700 comprising a TCR Originator device 1710, a TCR Transponder device 1720 and an external reference frame 1730, where 1) a position and orientation of the TCR Transponder device 1720 is calculated relative to a reference frame of the TCR Originator device 1710, and 2) a position and orientation of the TCR Originator device 1710 is further determined relative to the external reference frame 1730.

A TCR Transponder 1710 comprises an antenna pair 1712 and IMU and/or magnetometer 1714 similar to the illustration in FIG. 4. A TCR Originator 1720 comprises an antenna array 1724 similar to the illustration in FIG. 5, a graphical display 1726, an IMU and/or magnetometer 1728 and a GPS receiver 1730. TCR Originator 1720 additionally includes a TCR Originator coordinate frame 1722, having planes XY, YZ, and XZ to which the TCR Transponder 1710 is oriented against. The position and orientation determining system 1700 additionally includes an external coordinate frame 1740 having axes Xext, Yext and Zext against which the TCR Originator device 1720 is positioned and oriented with respect to. The external coordinate frame 1740 may include a Global Positioning System (GPS) coordinate reference frame.

Figure 18:
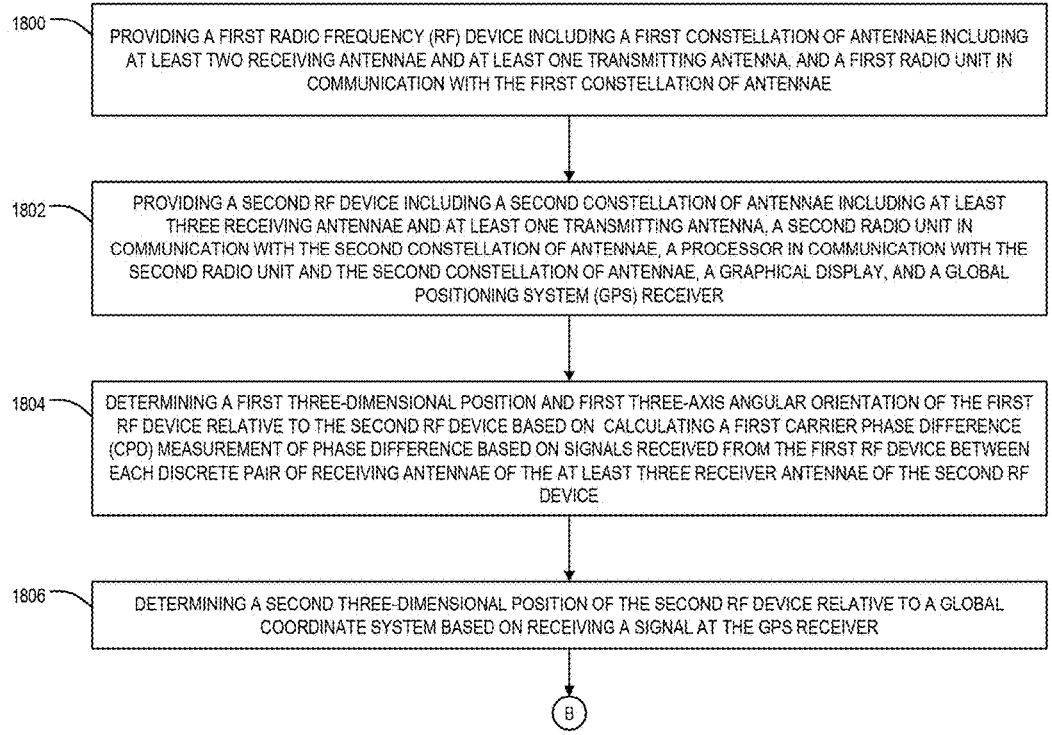
FIGS. 18-19 illustrate a logic flowchart describing method of determining a position and orientation of an object in accordance with the illustration and corresponding description of FIG. 17.
Figure 19:
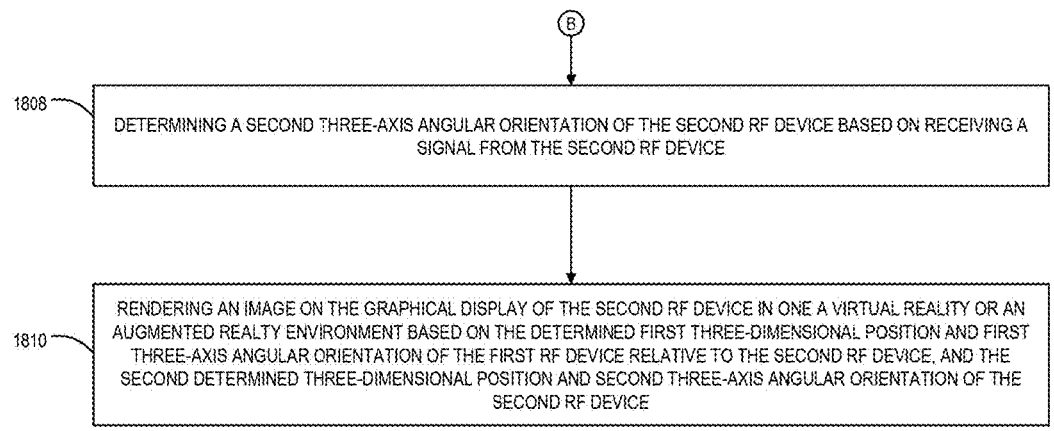

FIG. 18 and FIG. 19 further illustrate a logic flowchart describing method of determining a position and orientation of an object comprising providing 1800 a TCR radio frequency (RF) Transponder device 1710 including a first constellation of antennae 1712 including at least two receiving antennae and at least one transmitting antenna, a first radio unit in communication with the first constellation of antennae 1712.

The method further comprises providing 1802 a TCR RF Originator device 1720 including a second constellation of antennae 1724 including at least three receiving antennae and at least one transmitting antenna, a second radio unit in communication with the second constellation of antennae 1724, a processor in communication with the second radio unit and the second constellation of antennae 1724, a graphical display 1726, a global positioning system (GPS) receiver 1730.

The method further comprises determining 1804 a first three-dimensional position and first three-axis angular orientation of the TCR RF Transponder device 1710 relative to the TCR RF Originator device 1720 based on calculating a first carrier phase difference (CPD) measurement of phase difference based on signals received from the TCR RF Transponder device 1710 between each discrete pair of receiving antennae of the at least three receiver antennae of the TCR RF Originator device 1720.

The method further comprises determining 1806 a second three-dimensional position of the TCR RF Originator device 1720 relative to an external coordinate system based on receiving a signal at the GPS receiver.

The method further comprises determining 1808 a second three-axis angular orientation of the TCR RF Originator device 1720 based on receiving a signal from the IMU 1714 of the TCR RF Originator device 1720.

The method further comprises rendering 1810 an image on the graphical display 1826 of the TCR RF Originator device 1720 in one a virtual reality or an augmented realty environment based on the determined first three-dimensional position and first three-axis angular orientation of the TCR RF Transponder device 1710 relative to the TCR RF Originator device 1720, and the second determined three-dimensional position and second three-axis angular orientation of the TCR RF Originator device 1720.

The method further comprises determining the three-dimensional position of the TCR RF Transponder device 1710 relative to the TCR RF Originator device 1720 based on unwrapped carrier phase range (CPR) samples.

The method further comprises determining the three-dimensional position of the TCR RF Transponder device 1710 relative to the TCR RF Originator device 1720 by determining at least two of three angles of the TCR RF Transponder device 1710 relative to a coordinate frame (XY, XZ, YZ) of the TCR RF Originator device 1720 based on determining CPD measurement of phase difference by subtracting 1) a first carrier phase range (CPR) determined distance between a transmitting antenna of the TCR RF Transponder device 1710 and a first receiving antenna of a pair of receiving antennae of the at least three receiver antennae of the TCR RF Originator device 1720, from 2) a second CPR determined distance between the transmitting antenna of the TCR RF Transponder device 1710 and a second receiving antenna of the pair of receiving antennae of at least three receiver antennae of the TCR RF Originator device 1720.

The method of determining a position and orientation of an object where determining the three-dimensional position of the TCR RF Transponder device 1710 relative to the TCR RF Originator device 1720 by determining at least two of three angles of the TCR RF Transponder device 1710 relative to the coordinate frame of the TCR RF Originator device 1720 further comprises calculating an angle of the TCR RF Transponder device 1710 relative to the coordinate frame 1722 of the TCR RF Originator device 1720 by determining a quotient of the determined CPD over a baseline distance between the pair of receiving antennae of the TCR RF Originator device 1720.

The method further comprises providing each antenna of the first 1714 and second 1724 constellations of antennae as circular polarized antennae.

The method further comprises providing at least one but not all of the first 1714 or second 1724 constellations of antennae as linear polarized antennae, and providing the remainder of the first 1714 or second 1724 constellations of antennae as circular polarized antennae.

Regarding the routines presented in the methods illustrated in FIG. 13, FIGS. 15-16, and FIGS. 18-19, it should be appreciated that while they are expressed with discrete steps, these steps should be viewed as being logical in nature and may or may not correspond to any actual, discrete steps. Moreover, while these routines are set forth in a particular order in carrying out various functionality, the order that these steps are presented should not be construed as the only order in which the various steps may be carried out in their respective routines. Further, those skilled in the art will appreciate that logical steps may be combined together or be comprised of multiple steps.

Still further, while novel aspects of the disclosed subject matter are expressed in routines or methods, this functionality may also be embodied on computer-readable media. As those skilled in the art will appreciate, computer-readable media can host computer-executable instructions for later retrieval and execution. When executed on a computing device, the computer-executable instructions carry out various steps or methods. Examples of computer-readable media include, but are not limited to: optical storage media such as digital video discs (DVDs) and compact discs (CDs); magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. For purposes of this document, however, computer-readable media expressly excludes carrier waves and propagated signals.

Figure 20:
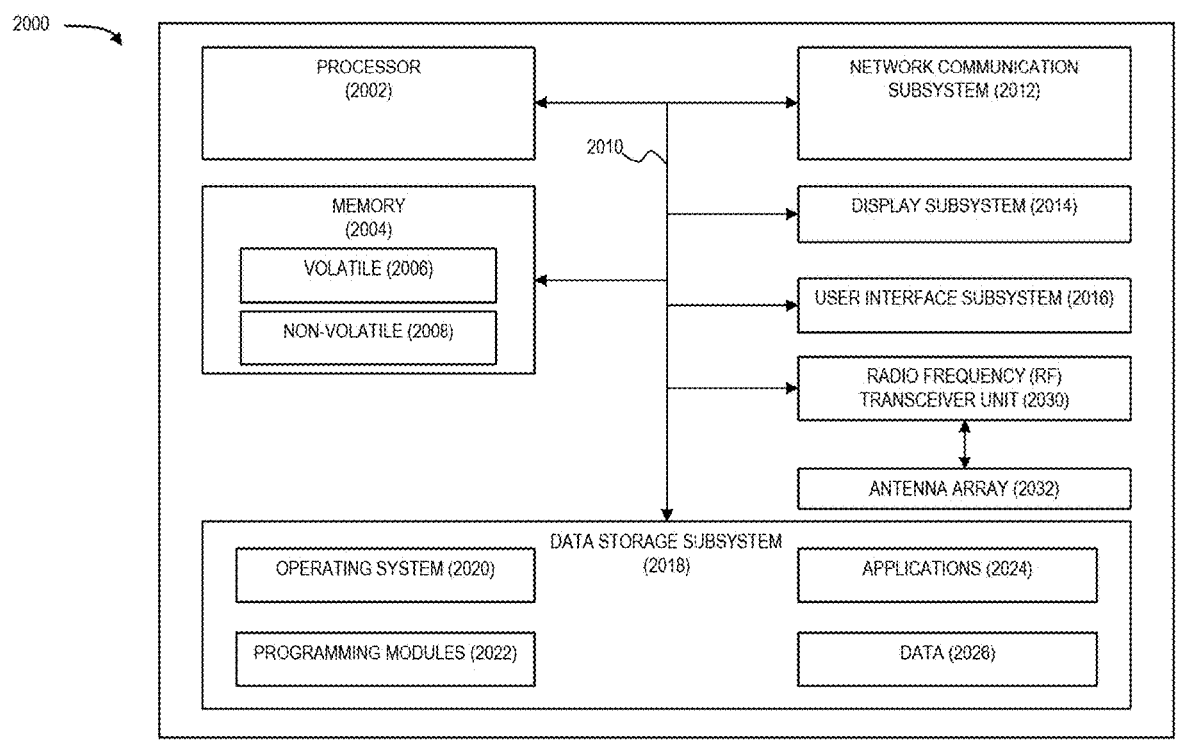
FIG. 20 illustrates a schematic diagram of an exemplary hardware environment that can be used to implement the TCR devices presented in the illustrative embodiments described in FIGS. 1-19 and 21-33, below.

FIG. 20 is a block diagram illustrating an exemplary computer system configured to determine a position and orientation of an object. In particular, in order to provide additional context for aspects of the disclosed subject matter, FIG. 20 and the following description are intended to provide a brief, general description of a suitable computing system 2000 in which the various aspects may be implemented.

The computing system 2000 includes a processor (or processing unit) 2002 and a memory 2004 interconnected by way of a system bus 2010. As those skilled in the art will appreciate, the processor executes instructions retrieved from the memory 2004 in carrying out various functions and, particularly, determine a position and orientation of an RF Controller device with respect to an RF Originator device. The processor may be comprised of any of various commercially available processors such as single-processor, multi-processor, single-core units, and multi-core units. Moreover, those skilled in the art will appreciate that the novel aspects of the disclosed subject matter may be practiced with other computer system configurations, including but not limited to: mini-computers; mainframe computers, personal computers (e.g., desktop computers, laptop computers, tablet computers, etc.); handheld computing devices such as smartphones, personal digital assistants, and the like; microprocessor-based or programmable consumer electronics; and the like.

The memory 2004 may be comprised of both volatile memory 2006 (e.g., random access memory or RAM) and non-volatile memory 2008 (e.g., ROM, EPROM, EEPROM, etc.) Moreover, the memory 2004 may obtain data and/or executable instructions (especially within the volatile memory 2006) from the data storage subsystem 2018 by way of the system bus 2010. Moreover, a basic input/output system (BIOS) can be stored in the non-volatile memory 2008 and conclude the basic routines that facilitate the communication of data and signals between complements within the computing system 2000, such as during startup of the computing system. The volatile memory 2006 may also include a high-speed RAM such as static RAM for caching data.

The system bus 2010 provides an interface for system components to enter communicate. The system bus 2010 can be of any of several types of bus structures that can interconnect the various components (both internal and external components). The computer system 2000 further includes a network communication subsystem 2012 for interconnecting with other computers and devices on a computer network. The network communication subsystem 2012 may be configured to communicate with an external network via a wired connection, a wireless connection, or both. The network communication subsystem 2012 may additionally be configured to communicate with an IMU, a magnetometer, and/or a GPS receiver (not shown in FIG. 20).

Also included in the computer system 2000 is a display subsystem 2014. It is through the display subsystem 2014 that the computer system presents a graphical display in an AR/VR environment. Further still, the computer system 2000 includes a user interface subsystem 2016 through which the computer system obtains user input. The user interface subsystem 2016 provides the interface with various user interface mechanisms including, but not limited to: voice input/output; visual recognition systems; keyboards; touchpads; touch- or gesture-based enabled surfaces (including display surfaces); pointing devices; and the like. Indeed, while the display subsystem 2014 has been individually called out as part of the computer system 2000, those skilled in the art will appreciate that in many configurations the display subsystem 2014 is part of the user interface subsystem 2016.

Additionally, a Radio Frequency (RF) transceiver unit 2030 may additionally be in communication with the system bus 2010 and/or network communication subsystem 2012 to communicate and receiver information to and from the antenna array 2032.

The data storage subsystem 2018 provides an additional storage system in addition to the memory 2004. Within the data storage subsystem 2018 can be found the operating system 2020 for the computer system 2000, applications 2024 (which may include one or more applications that are configured to render a graphical image in a display device based on the position and orientation of the TCR Transponder device); executable modules 2022; as well as data 2026. Indeed, the determination of a position and an orientation, is not limited to the instructions necessary to implement the functionality outlined in regard to routines illustrated in FIGS. 13, 15-16 and 18-19 described above, and FIGS. 27, 29-30 and 32-33 described below.

It should be appreciated, of course, that many of the components and/or subsystems described as being part of the computer system 2000 should be viewed as logical components for carrying out various functions of a suitably configured computer system. As those skilled in the art appreciate, logical components (or subsystems) may or may not correspond directly in a 1:1 manner to actual components. Moreover, in an actual illustrative embodiment, these components may be combined together or broke up across multiple actual components.

The illustrative embodiments presented herein to enable six-degrees of freedom tracking for AR/VR environments provide for the following key features: smooth and accurate tracking of the controller's position and attitude relative to another sensor system, e.g., the TCR HMD device 120, and/or relative to the world and real objects in the immediate environment; low latency and real-time tracking; robustness of tracking performance when line of sight between the TCR HMD device 120 and controller is obscured or blocked; and lower system and component cost and complexity suitable for commercial applications.

By utilizing RF sensing, the above presented illustrative embodiments improve upon existing location determining systems by 1) reducing dependence on strict line of sight, as RF line of sight is more forgiving than that required by camera, optical, and laser based approaches; 2) improving performance in different environments, as camera, optical, and laser based approaches are sensitive to ambient lighting conditions and sunlight; 3) combining wireless data communications between Controller(s) and TCR HMD device 120 with sensor measurements, thereby reducing the need for a separate data communication link; and 4) improves location and orientation tracking by providing simpler, lower power sensor fusion resulting in better performance sensor observations rather than computational heavy camera/vision location determining systems.

In a second embodiment, illustrated in the following FIGS. 21-33, three degree-of-freedom positioning may be accomplished using a single antenna in the TCR Controller device 110' rather than a pair of antennae in the TCR Controller device 110 as described in FIGS. 1-19. In the following description, similar reference numbers will be used in the description of the second embodiment to identical elements described in the first embodiment for consistency.

Generally, the second embodiment is suitable for estimating full 3-DOF position estimation of a second embodiment TCR Controller 110' relative to the TCR HMD 120 given a single RX/TX antenna on the TCR Controller 110'. To relate the coordinate frames of the TCR Controller 110' and TCR HMD 120, the position of the TCR HMD 120 must be known, measured, estimated, or remain fixed relative to a given local coordinate frame. For example, a single TCR Controller antenna is measured by a plurality of pairs of antennae on the TCR HMD 120 to obtain CPD measurements between discrete antenna pairs as previously disclosed above in the first embodiment illustrated in FIGS. 1-19.

The three-dimensional (3D) position of the TCR Controller 110' relative to the TCR HMD 120 may be calculated by two methods:

1) Triangulation: a 3D-position of the TCR Controller 110' may be computed by simply calculating the intersection of three planes passing through the TCR HMD 120 antenna locations at angles computed from CPD measurements taken between each pair of antennae on the TCR HMD 120; or 2) Triangulateration: a 3D-position may be computed directly from the distance between the TCR Controller 110' and TCR HMD 120 (CPR or baseband range measurement), and two of the three angles in the TCR HMD 120 coordinate frame (XY, XZ, YZ) that can be computed from the CPD measurements taken between each pair of antennae on the TCR HMD 120. This latter method simply measures the position via a distance and a bearing from a known position.

The TCR HMD 120 measurements of CPD from 3 antennae on the TCR HMD 120 and CPR measurement between the antennae on the TCR HMD 120 and the single antenna on the TCR Controller 110' may be used to calculate the distance and angles.

Additional CPD measurements and antennas may be used to over-determine and improve the positioning solution. Additional TCR measurements (Baseband Range, CPV, TDR, etc.) may be used to further aid the positioning solution but are not required.

Furthermore, in an additional alternative embodiment, if the orientation of the TCR HMD 120 is known, may be measured or estimated, or remains fixed relative to the local level frame, then by adding an IMU to the TCR Controller 110', the 3D-orientation of the TCR Controller 110' may be estimated separately or together with the above-identified determined position in a single fusion method to obtain a full six degree-of-freedom determination of the TCR Controller 110' with respect to the TCR HMD 120.

Figure 21:
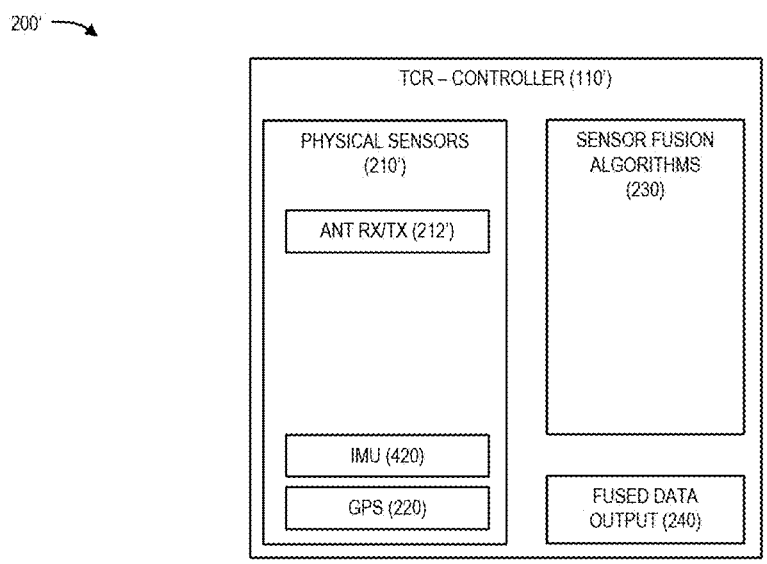
FIG. 21 illustrates a second embodiment of a logical element schematic of a TCR Controller device.

FIG. 21, similar to FIG. 2, illustrates a second embodiment of a logical element schematic of a TCR Controller device 100'. Particularly, FIG. 21 illustrates a logical element schematic 200' of a TCR Controller device 110' of the second embodiment comprising a plurality of physical sensors 210 that collect raw data observables and includes a single Rx/Tx antenna 212', an IMU device 218 and/or a GPS device 220.

Figure 22:
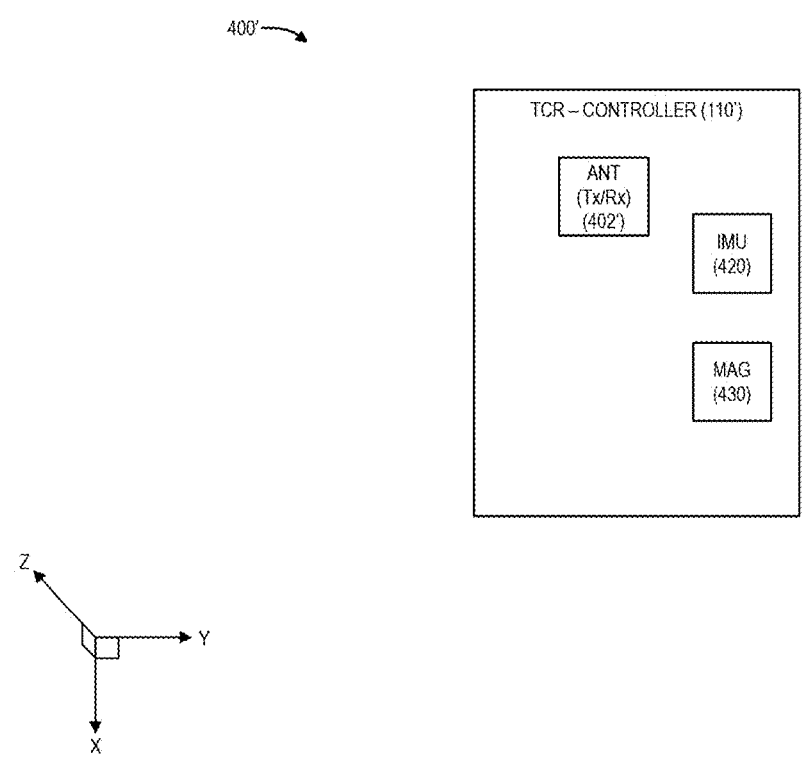
FIG. 22 illustrates a second embodiment of a schematic diagram of an illustrative sensor hardware on a TCR Controller device.

FIG. 22, similarly to FIG. 4, illustrates a second embodiment of a schematic diagram of an illustrative sensor hardware on a TCR Controller device 100'. Particularly, FIG. 22 illustrates a schematic diagram 400' of the second embodiment of sensor hardware on the TCR Controller device 110'. The TCR Controller device 110' may include a single Tx/Rx antenna 402'. The TCR Controller device 110 may also include an IMU 420 and magnetometer 430 for providing raw data observables to determine orientation/attitude with respect to the TCR HMD device 120 as described above.

Figure 23:
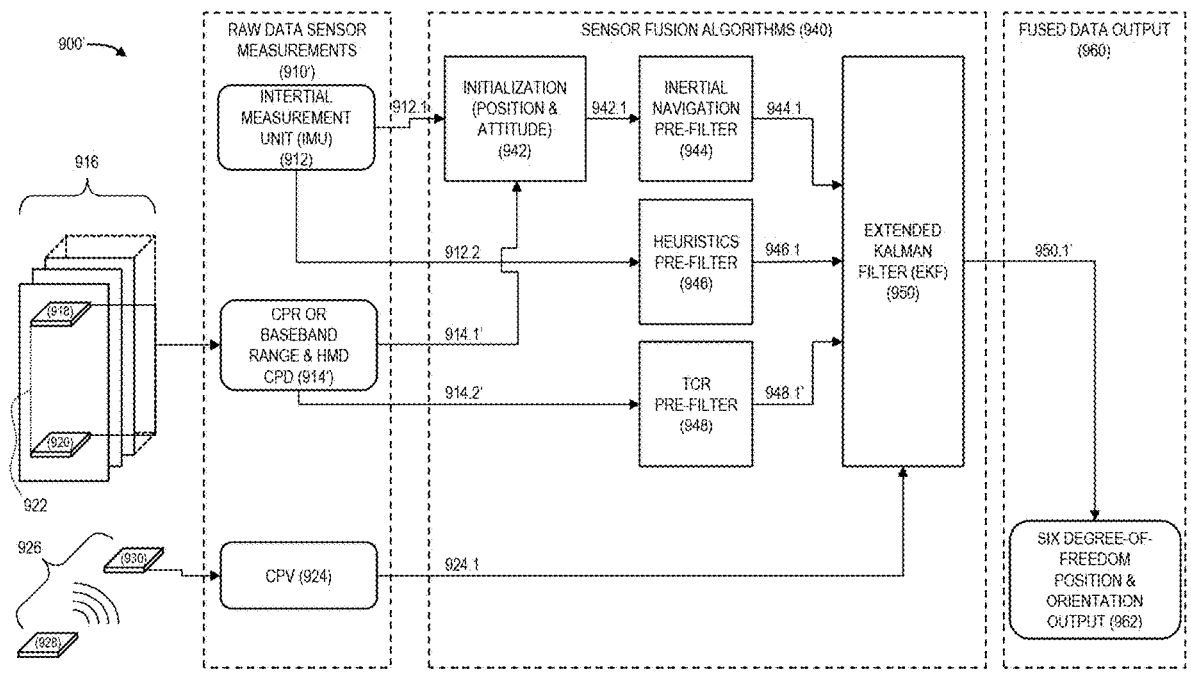
FIG. 23 illustrates a second embodiment of a signal processing schematic diagram representing signal paths of raw data observable measurements and their corresponding processing via sensor fusion algorithms into a fused data output

FIG. 23, similarly to FIG. 9, illustrates a second embodiment of a signal processing schematic diagram representing signal paths of raw data observable measurements and their corresponding processing via sensor fusion algorithms into a fused data output. Particularly, FIG. 23 illustrates a signal processing schematic diagram 900' representing signal paths of raw data observable measurements 910' and their corresponding processing via sensor fusion algorithms 940 into a fused data output 960. Software for sensor fusion for the illustrative embodiments described herein may occur on an embedded processor, digital signal processor (DSP), field programmable gate array (FPGA), or application-specific integrated circuit (ASIC) that is present on the TCR Controller device 110', TCR HMD device 120, and/or an external host PC or computing device.

Raw data sensor observable measurements 910' at either the TCR Controller device 110' and/or the TCR HMD device 120 may be taken from three sources: an IMU 912, TCR antenna(e) providing CPR and CPD measurements 914', and TCR antenna(e) providing CPV measurements 924.

CPR or Baseband Range and HMD CPD 914' logic element obtains CPR and CPD observable data from antenna signals on the TCR HMD device 120 based on signals received from the single RX/TX antenna of the TCR Controller 110'. Particularly, CPD observable data is collected from discrete CPD antenna pairs 916 of the TCR HMD device 120, for example, represented by a first antenna 918 and a second corresponding antenna 920 of a CPD antenna pair 916. Antennae baseline distance 922 between each corresponding antenna pair 918, 920 of the TCR HMD device 120 is also collected to be used to calculate the CPD observable data. CPR/CPD data 924.1' may be sent to initialization algorithm 942 of position and orientation/attitude and the same CPR/CPD data 914.2' may be sent to the TCR pre-filter algorithm 948. TCR pre-filter data 948.1' is subsequently sent to the EKF 950 for further filtering based on CPV data 924.1. Thereafter, EKF filter algorithm 950 outputs EKF filtered data 950.1' to provide a fused data output 960 comprising six-degrees of freedom position and orientation output 962.

Figure 24:
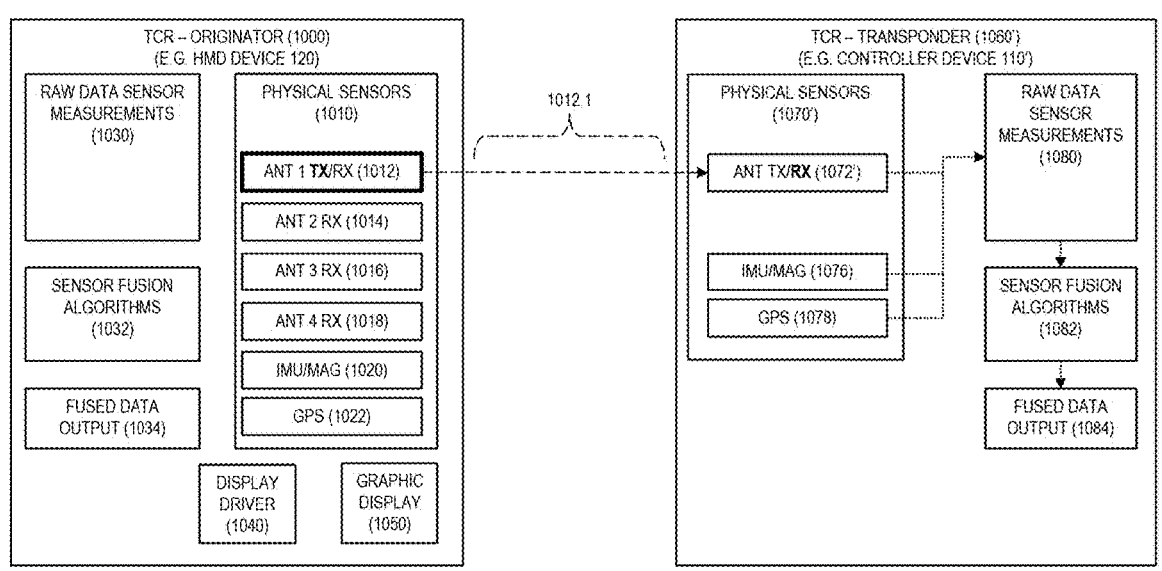
FIG. 24 illustrates a second embodiment of a first communication sequence between corresponding TCR devices of the position and orientation determining system.
Figure 25:
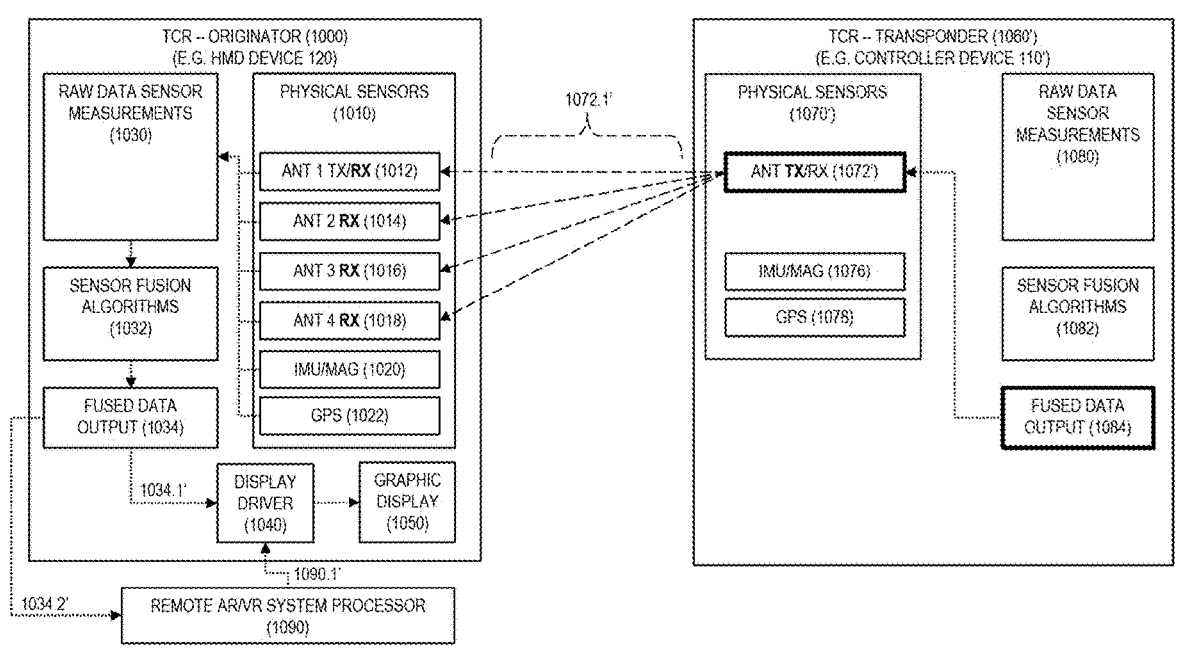
FIG. 25 illustrates a second embodiment of a second subsequent communication sequence between corresponding TCR devices of the position and orientation determining system.

FIGS. 24 and 25, similar to FIGS. 10 and 11, illustrate a second embodiment of a communication sequence between corresponding TCR devices of the position and orientation determining system 100' as shown from FIGS. 21 to 23.

FIG. 24, similarly to FIG. 10, illustrates a second embodiment of a first communication sequence between corresponding TCR devices of the position and orientation determining system. Particularly, FIG. 24 illustrates a second illustrative embodiment of a communication sequence originated by a TCR Originator device 1000, e.g., TCR HMD device 120, and a TCR Transponder device 1060', e.g., TCR Controller device 110' having a single antenna. First, the TCR Originator device 1000 activates a transmitter antenna, e.g., ANT 1 TX/RX 1012, to transmit a preamble and a data payload via a carrier frequency at operation 1012.1 to the TCR Transponder 1060' for reception by the single receiving antenna thereon, e.g., ANT TX/RX 1072'.

Upon receiving the preamble and data payload from the TCR Originator 1000, the TCR Transponder 1060' forwards the antenna received preamble and data payload to the raw data observable measurements unit 1080 for calculation of CPR, CPD and CPV observable measurements in addition to IMU and/or magnetometer 1076 data, and/or GPS 1078 data. These data are then processed by the sensor fusion algorithms 1082, to produce baseband ranging data including master clock number counts, clock dynamic measurements and time-of-flight data, CPR data, CPV data, CPD data and orientation data based on the IMU/MAG device 1076. The data after passing through the EKF (e.g., EKF 950 in FIG. 23) is then output as fused data output 1084.

FIG. 25, similarly to FIG. 11, illustrates a second embodiment of a second subsequent communication sequence between corresponding TCR devices of the position and orientation determining system. Particularly, FIG. 25 illustrates a second illustrative embodiment of a communication sequence where a TCR Transponder device 1060' responds to the communication received from the TCR Originator device 1000 of FIG. 24. The fused data output 1084 previously output by the sensor fusion algorithms 1082 is sent as a data payload with a TCR Transponder specific preamble to the transmitter antenna of the TCR Transponder, e.g., ANT TX/RX 1072'. The transmitting antenna transmits the TCR Transponder 1060 preamble and data payload 1072.1' to any receiving antennae of the TCR Originator device 1000, e.g., in this illustration, ANT1 to ANT4, designated by reference numbers 1012, 1014, 1016 and 1018.

In a manner similar to the first embodiment illustrated in FIG. 9, the fused data output 1034 at operation 1034.1' may be output to a display driver 1040 integral with the TCR Originator device 1000 to process graphic display information for presentation to a graphic display 1050 integrated with or for use in conjunction with the TCR Originator device 1000.

In an alternative illustrative embodiment, the fused data output 1034 at operation 1034.2' may be output to a remote AR/VR system processor 1090 that may further process the fused data output 1034 and at operation 1090.1' and return data to the display driver 1040 of the TCR Originator device 1000 for presentation to the graphic display 1050.

Figure 26:
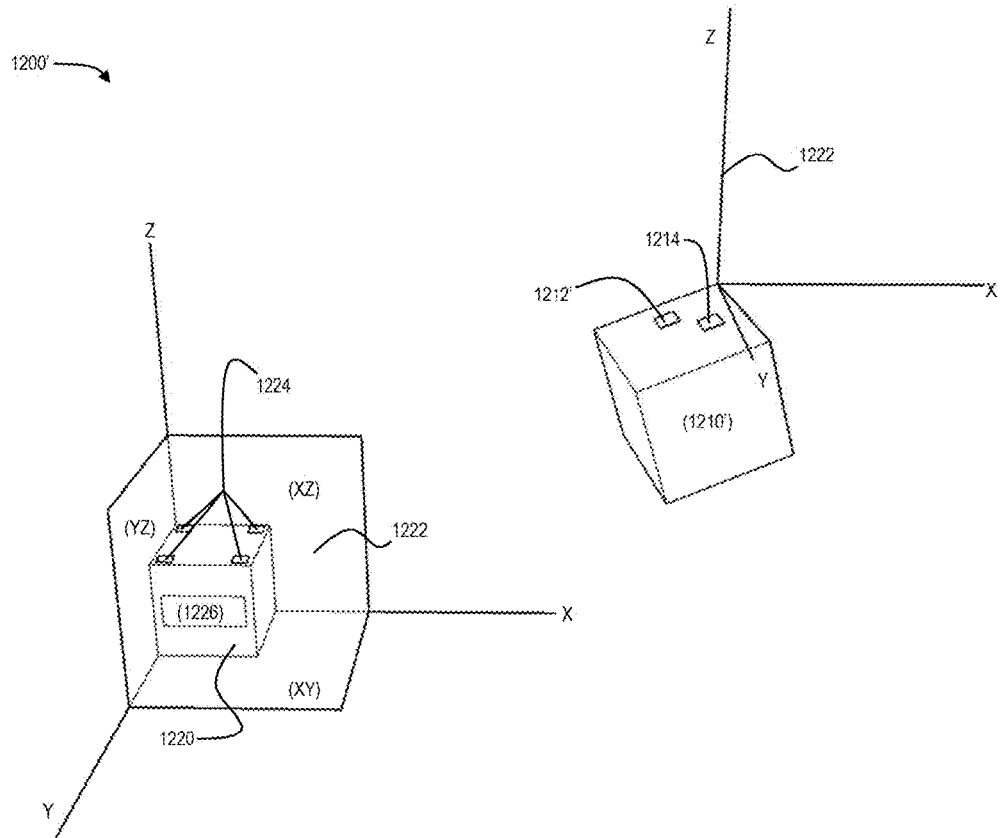
FIG. 26 illustrates a second embodiment of a schematic diagram of one illustrative embodiment of a position and orientation determining system comprising a TCR Transponder device and a TCR Originator device, where a position and orientation of the TCR Transponder device is calculated relative to a reference frame of the TCR Originator device.

FIG. 26, similarly to FIG. 12, illustrates a second embodiment of a schematic diagram of one illustrative embodiment of a position and orientation determining system comprising a TCR Transponder device and a TCR Originator device, where a position and orientation of the TCR Transponder device is calculated relative to a reference frame of the TCR Originator device. Particularly, FIG. 26 illustrates a schematic diagram of one illustrative embodiment of a position and orientation determining system 1200' comprising a TCR Transponder device 1210' and a TCR Originator device 1220, where a position and orientation of the TCR Transponder device 1210' is calculated relative to a reference frame of the TCR Originator device 1220.

A TCR Transponder device 1210' comprises a single antenna 1212' and IMU and/or magnetometer 1214 similar to the illustration in FIGS. 21-22. A TCR Originator device 1220 comprises an antenna array 1224 similar to the illustration in FIG. 5 and a graphical display 1226. TCR Originator device 1220 additionally includes a TCR Originator coordinate frame 1222, having planes XY, YZ, and XZ to which the TCR Transponder device 1210' is oriented against.

Figure 27:
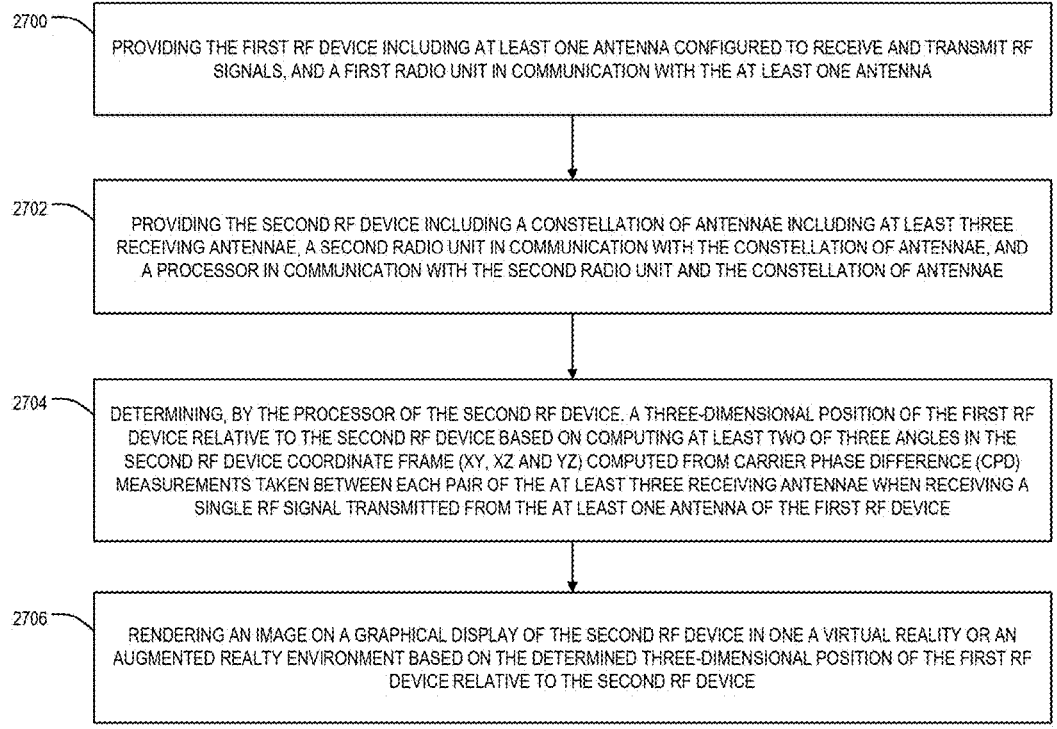
FIG. 27 illustrates a second embodiment of a logic flowchart describing a method of determining a position and orientation of the TCR Transponder device relative to the TCR Originator device.

FIG. 27, similarly to FIG. 13, illustrates a second embodiment of a logic flowchart describing a method of determining a position and orientation of the TCR Transponder device relative to the TCR Originator device. Particularly, FIG. 27 further illustrates a logic flowchart describing a method of determining a position and orientation of the TCR Transponder device 1210' (substantially equivalent to the TCR controller 110' of illustrated in FIGS. 21-22 and 24-25), relative to the TCR Originator device 1220, where the method comprises providing 2700 a TCR radio frequency (RF) Transponder device 1210 including a first constellation of antennae 1212 including at least two receiving antennae and at least one transmitting antenna, a first radio unit in communication with the first constellation of antennae 1212.

The method further comprises 2702 providing a TCR RF Originator device 1220 including a second constellation of antennae 1224 including at least three receiving antennae and at least one transmitting antenna, a second radio unit in communication with the second constellation of antennae 1224, a processor in communication with the second radio unit and the second constellation of antennae 1224, and a graphical display 1226.

The method further comprises determining 2704 a three-dimensional position and three-axis angular orientation of the TCR RF Transponder device 1210 relative to the TCR RF Originator device 1220 based on calculating a carrier phase difference (CPD) measurement of phase difference based on signals received from the TCR RF Originator device 1220 between each discrete pair of receiving antennae of the at least three receiver antennae of the TCR RF device 1220.

The method further comprises rendering 2706 an image on a graphical display 1226 of the TCR RF Originator device 1220 in one a virtual reality or an augmented realty environment based on the determined three-dimensional position of the TCR RF Transponder device 1210 relative to the TCR RF Originator device 1220.

Wherein the method including determining, by the processor of the second RF device 1220, the three-dimensional position of the first RF device 1210' relative to the second RF device, further includes computing an intersection of three planes passing through each of the at least three receiving antenna locations 1224 based on computing three angles in the second RF device 1220 coordinate frame (XY, XZ and YZ) 1222.

Wherein the method including determining; by the processor of the second RF device 1220, the three-dimensional position of the first RF device 1210' relative to the second RF device 1220 further includes computing a distance between the first RF device 1210' and the second RF device 1220.

Wherein the method of computing the distance between the first RF device 1210' and the second RF device 1220 further includes measuring a carrier phase range (CPR) measurement of the distance between the transacting first RF 1210' and second RF 1220 devices.

Wherein the method of computing the distance between the first RF device 1210' and the second RF device 1220 further includes measuring a baseband code phase range measurement of round-trip RF time-of-flight (TOF) representing the distance between the transacting first RF 1210' and second RF 1220 devices.

Wherein the method of determining CPD measurement of phase difference further includes subtracting a first carrier phase measured from the at least one antenna 1212' of the first RF device 1210' at a first receiving antenna of a pair of the at least three receiving antennae 1224 of the second RF device 1220, from a second carrier phase measured from the at least one antenna 1212' of the first RF device at a second receiving antenna of the pair of the at least three receiving antennae 1224 of the second RF device 1220. The method further includes calculating an angle of bearing to the first RF device 1210' relative to the coordinate frame 1222 of the second RF device 1220 by determining a quotient of the determined CPD measurement over a baseline distance between the pair of the at least three receiving antennae 1224 of the second RF device 1220.

The method of determining the three-dimensional position further includes providing the first RF device 1210' with an inertial measurement unit (IMU) 1214; and determining a three-axis angular orientation of the first RF device 1210' relative to the second RF device 1220 based on estimating a direction of a gravity vector generated by the IMU 1214.

Figure 28:
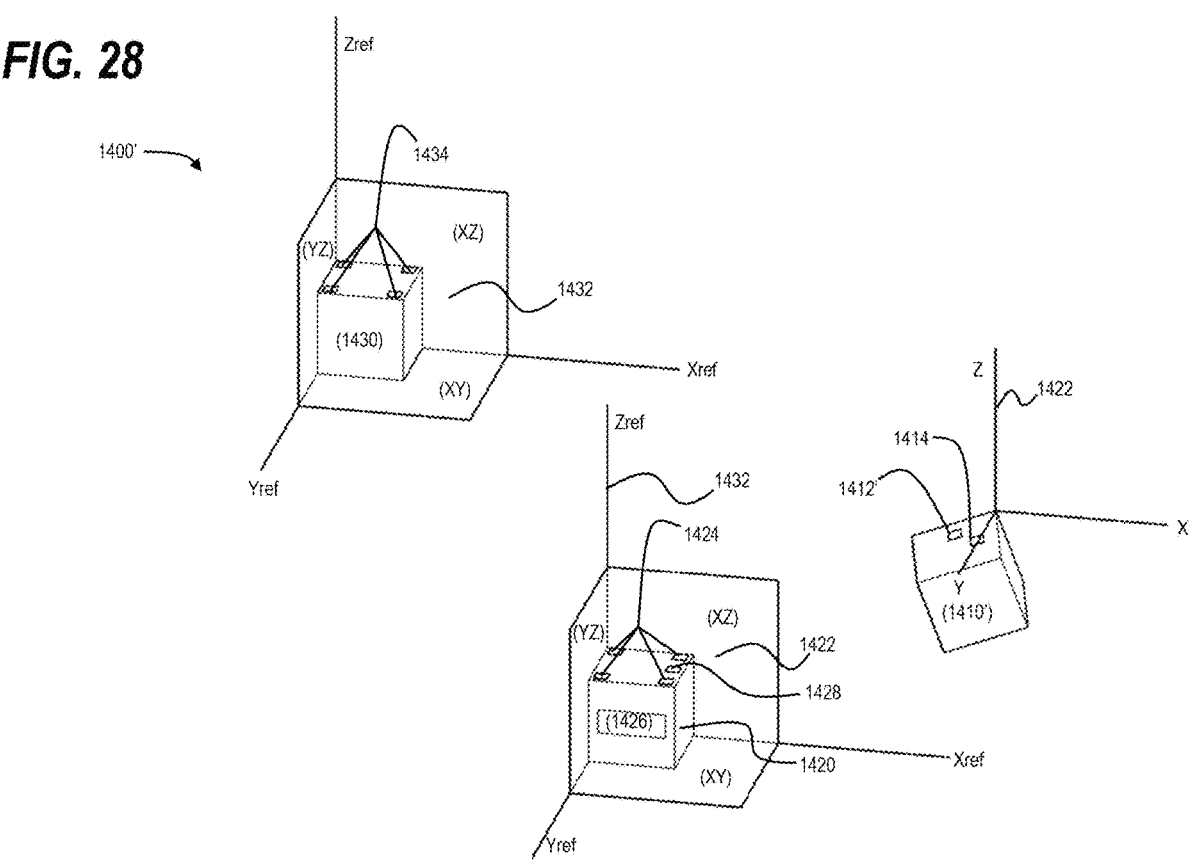
FIG. 28 illustrates a second embodiment of a schematic diagram of another illustrative embodiment of a position and orientation determining system comprising a TCR Originator device, a TCR Transponder device and an external TCR processing device.

FIG. 28, similarly to FIG. 14, illustrates a second embodiment of a schematic diagram of another illustrative embodiment of a position and orientation determining system comprising a TCR Originator device 1420, a TCR Transponder device 1410', (substantially equivalent to the TCR controller 110' of illustrated in FIGS. 21-22 and 24-25), and an external TCR processing device 1430. Particularly, FIG. 28 illustrates a schematic diagram of another illustrative embodiment of a position and orientation determining system 1400' comprising a TCR Originator device 1410', a TCR Transponder device 1420 and an external TCR processing device 1430, where 1) a position and orientation of the TCR Transponder device 1420 is calculated relative to a reference frame of the TCR Originator device 1410', and 2) a position and orientation of the TCR Originator device 1410' is further determined relative to a reference frame of the external TCR processing device 1430.

A TCR Transponder 1410' comprises a single antenna 1412' and IMU and/or magnetometer 1414 similar to the illustration in FIGS. 21-22. A TCR Originator 1420 comprises an antenna array 1424 similar to the illustration in FIG. 5, a graphical display 1426 and an IMU and/or magnetometer 1428. TCR Originator 1420 additionally includes a TCR Originator coordinate frame 1422, having planes XY, YZ, and XZ to which the TCR Transponder 1410' is oriented against. A reference TCR 1430 includes a reference TCR coordinate frame having axes Xref, Yref and Zref, and a reference TCR antenna array 1434.

Figure 29:
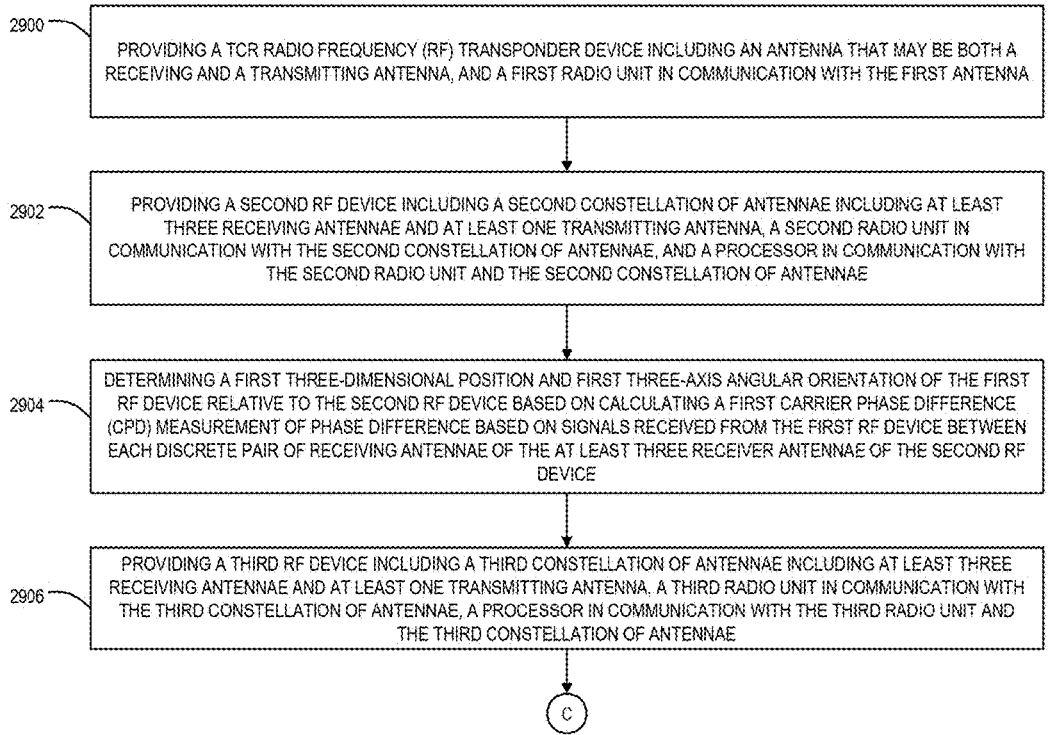
FIGS. 29-30 illustrate a second embodiment of a logic flowchart describing method of determining a position and orientation of an object in accordance with the illustration of and corresponding description of FIG. 28.
Figure 30:
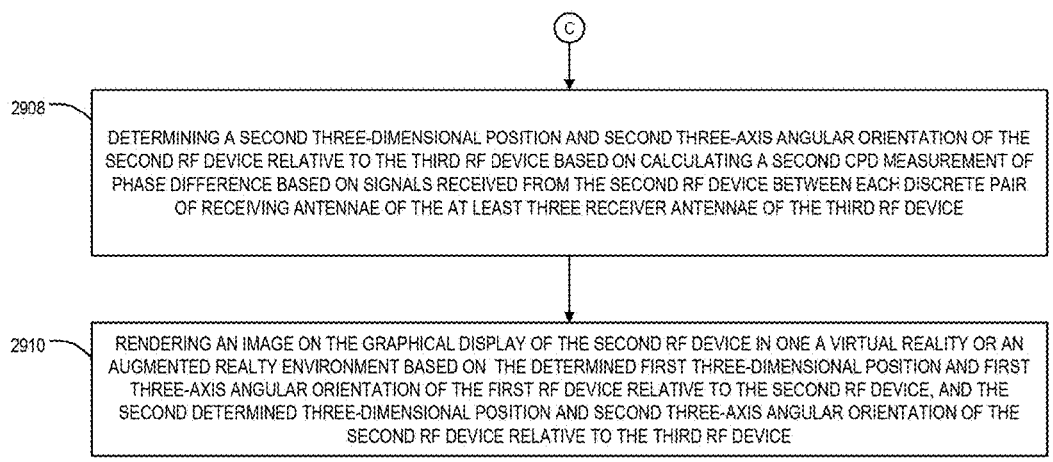

FIGS. 29-30, similarly to FIGS. 15-16, illustrate a second embodiment of a logic flowchart describing method of determining a position and orientation of an object in accordance with the illustration of and corresponding description of FIG. 28. Particularly, FIGS. 29-30 further illustrate a logic flowchart describing method of determining a position and orientation of an object comprising providing 2900 a TCR radio frequency (RF) Transponder device 1410' including an antenna 1412' that may be both a receiving and a transmitting antenna, and a first radio unit in communication with the first antenna 1412'.

The method further comprises providing 2902 a TCR RF Originator device 1420 including a second constellation of antennae 1424 including at least three receiving antennae and at least one transmitting antenna, a second radio unit in communication with the second constellation of antennae 1424, a processor in communication with the second radio unit and the second constellation of antennae 1424, and a graphical display 1426.

The method further comprises determining 2904 a first three-dimensional position and first three-axis angular orientation of the TCR RF Transponder device 1410' relative to the TCR RF Originator device 1420 based on calculating a first carrier phase difference (CPD) measurement of phase difference based on signals received from the TCR RF Transponder device 1410' between each discrete pair of receiving antennae of the at least three receiver antennae of the TCR RF Origination 1420 device.

The method further comprises providing 2906 a reference TCR RF device 1430 including a third constellation of antennae 1434 including at least three receiving antennae and at least one transmitting antenna, a third radio unit in communication with the third constellation of antennae, a processor in communication with the third radio unit and the third constellation of antennae 1434.

The method further comprises determining 2908 a second three-dimensional position and second three-axis angular orientation of the TCR RF Origination device 1420 relative to the reference TCR RF device 1430 based on calculating a second CPD measurement of phase difference based on signals received from the TCR RF Origination device 1420 between each discrete pair of receiving antennae of the at least three receiver antennae of the reference TCR RF device 1430.

The method further comprises rendering 2910 an image on the graphical display 1426 of the TCR RF Origination device 1420 in one a virtual reality or an augmented realty environment based on the determined first three-dimensional position and first three-axis angular orientation of the TCR RF Transponder device 1410" relative to the TCR RF Origination device 1420, and the second determined three-dimensional position and second three-axis angular orientation of the TCR RF Origination device 1420 relative to the reference TCR RF device 1430.

The method further comprises determining the three-dimensional position of the TCR RF Transponder device 1410' relative to the TCR RF Origination device 1420 based on unwrapped carrier phase range (CPR) samples.

The method further comprises determining the three-dimensional position of the TCR RF Transponder device 1410' relative to the TCR RF Originator device 1420 by determining at least two of three angles of the TCR RF Transponder device relative to a coordinate frame (XY, XZ, YZ) of the TCR RF Originator device 1420 based on determining CPD measurement of phase difference by subtracting 1) a first carrier phase range (CPR) determined distance between a transmitting antenna of the TCR RF Transponder device and a first receiving antenna of a pair of receiving antennae of the at least three receiver antennae of the TCR RF Originator device 1420, from 2) a second CPR determined distance between the transmitting antenna of the TCR RF Transponder device 1410' and a second receiving antenna of the pair of receiving antennae of at least three receiver antennae of the TCR RF Originator device 1420.

The method of determining a position and orientation of an object wherein determining the three-dimensional position of the TCR RF Transponder device relative to the TCR RF Originator device 1420 by determining at least two of three angles of the TCR RF Transponder device 1410' relative to the coordinate frame of the TCR RF Originator device 1420 further comprises calculating an angle of the TCR RF Transponder device 1410' relative to the coordinate frame of the TCR RF Originator device 1420 by determining a quotient of the determined CPD over a baseline distance between the pair of receiving antennae of the TCR RF Originator device 1420.

The method further comprises providing each antenna of the first 1412' and second 1424 constellations of antennae as circular polarized antennae.

The method further comprises providing the first constellation of antennae 1412' as one of linear polarized antennae or circular polarized antennae, and the second constellation of antennae 1424 as the other one of linear polarized antennae or circular polarized antennae.

Figure 31:
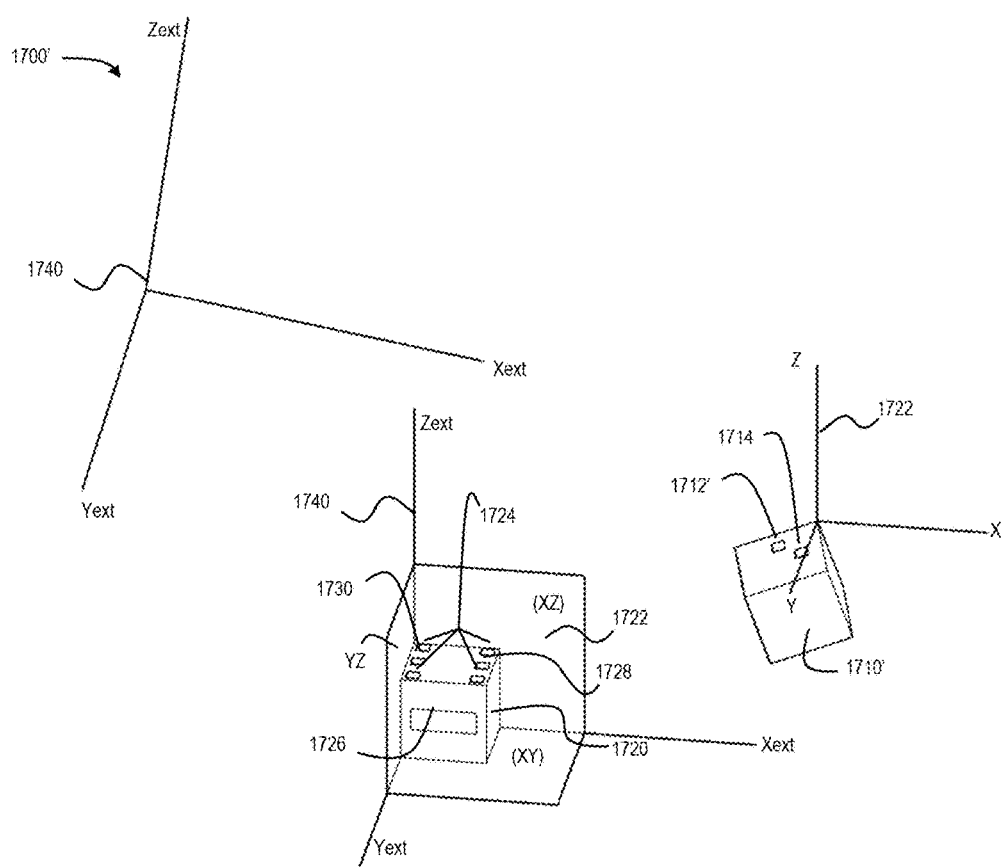
FIG. 31 illustrates a second embodiment of a schematic diagram of another illustrative embodiment of a position and orientation determining system comprising a TCR Originator device, a TCR Transponder device and an external reference frame.

FIG. 31, similarly to FIG. 17, illustrates a second embodiment of a schematic diagram of another illustrative embodiment of a position and orientation determining system comprising a TCR Originator device, a TCR Transponder device and an external reference frame. Particularly, FIG. 31 illustrates a schematic diagram of another illustrative embodiment of a position and orientation determining system 1700' comprising a TCR Transponder device 1710', (substantially equivalent to the TCR controller 110' of illustrated in FIGS. 21-22 and 24-25), a TCR Originator device 1720 and an external reference frame 1740, where 1) a position and orientation of the TCR Transponder device 1710' is calculated relative to a reference frame of the TCR Originator device 1720, and 2) a position and orientation of the TCR Originator device 1720 is further determined relative to the external reference frame 1740.

A TCR Transponder 1710' comprises a single antenna 1712' and an IMU and/or magnetometer 1714 similar to the illustration in FIGS. 21-22. A TCR Originator 1720 comprises an antenna array 1724 similar to the illustration in FIG. 5, a graphical display 1726, an IMU and/or magnetometer 1728 and a GPS receiver 1730. TCR Originator 1720 additionally includes a TCR Originator coordinate frame 1722, having planes XY, YZ, and XZ to which the TCR Transponder 1710' is oriented against. The position and orientation determining system 1700' additionally includes an external coordinate frame 1740 having axes Xext, Yext and Zext against which the TCR Originator device 1720 is positioned and oriented with respect to. The external coordinate frame 1740 may include a Global Positioning System (GPS) coordinate reference frame.

Figure 32:
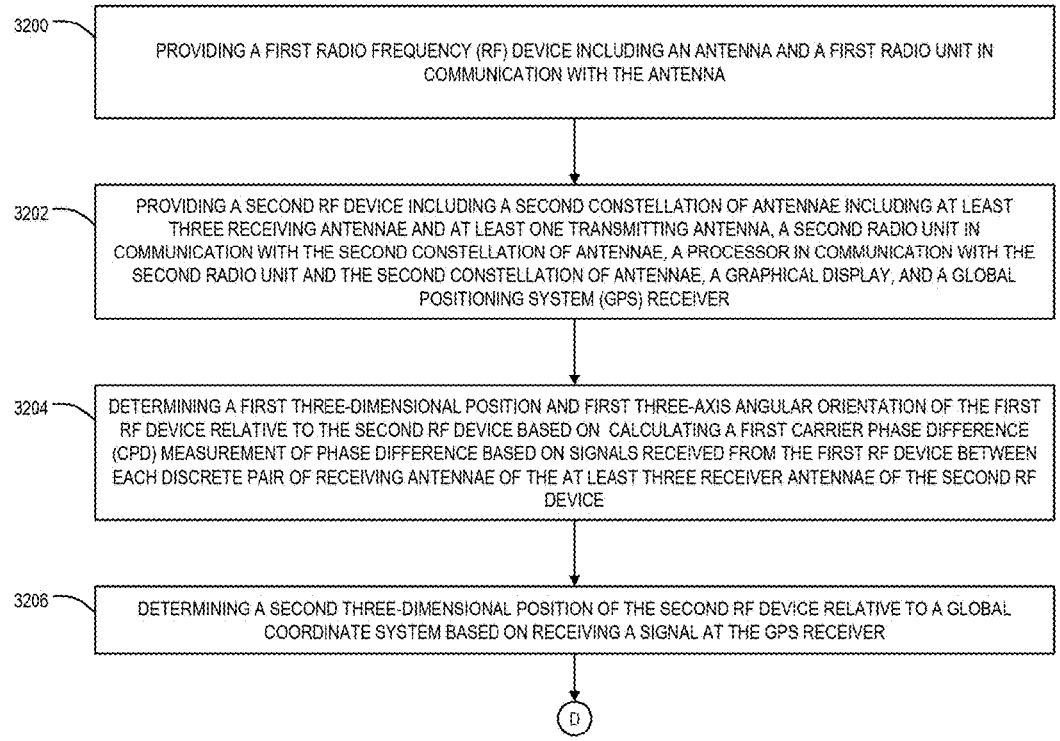
FIGS. 32-33 illustrate a second embodiment of a logic flowchart describing method of determining a position and orientation of an object in accordance with the illustration and corresponding description of FIG. 31.
Figure 33:
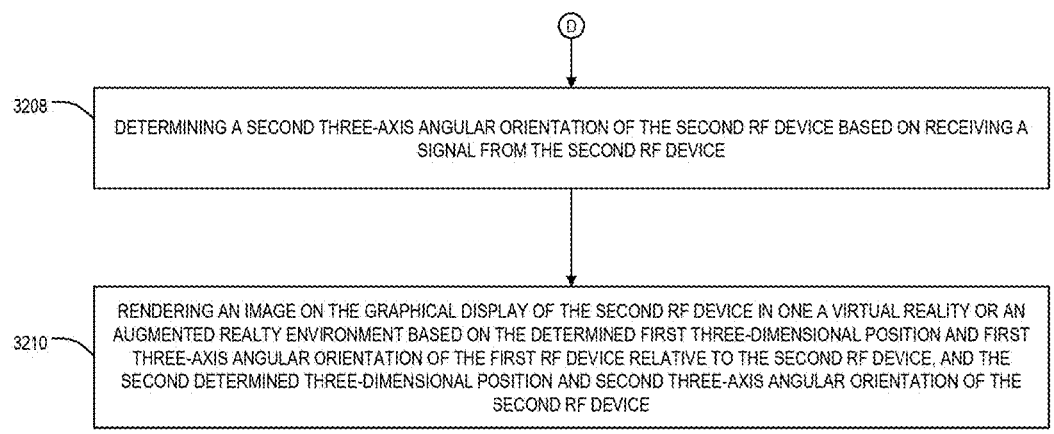

FIGS. 32-33, similarly to FIGS. 18-19, illustrate a second embodiment of a logic flowchart describing method of determining a position and orientation of an object in accordance with the illustration and corresponding description of FIG. 31. Particularly, FIGS. 32 and 33 further illustrate a logic flowchart describing method of determining a position and orientation of an object comprising providing 3200 a TCR radio frequency (RF) Transponder device 1710' including an antenna 1712' that may be both a receiving and a transmitting antenna, and a first radio unit in communication with the antenna 1712'.

The method further comprises providing 3202 a TCR RF Originator device 1720 including a second constellation of antennae 1724 including at least three receiving antennae and at least one transmitting antenna, a second radio unit in communication with the second constellation of antennae 1724, a processor in communication with the second radio unit and the second constellation of antennae 1724, a graphical display 1726, a global positioning system (GPS) receiver 1730.

The method further comprises determining 3204 a first three-dimensional position and first three-axis angular orientation of the TCR RF Transponder device 1710' relative to the TCR RF Originator device 1720 based on calculating a first carrier phase difference (CPD) measurement of phase difference based on signals received from the TCR RF Transponder device 1710' between each discrete pair of receiving antennae of the at least three receiver antennae of the TCR RF Originator device 1720.

The method further comprises determining 3206 a second three-dimensional position of the TCR RF Originator device 1720 relative to an external coordinate system based on receiving a signal at the GPS receiver.

The method further comprises determining 3208 a second three-axis angular orientation of the TCR RF Originator device 1720 based on receiving a signal from the IMU 1714 of the TCR RF Originator device 1720.

The method further comprises rendering 3210 an image on the graphical display 1826 of the TCR RF Originator device 1720 in one a virtual reality or an augmented realty environment based on the determined first three-dimensional position and first three-axis angular orientation of the TCR RF Transponder device 1710' relative to the TCR RF Originator device 1720, and the second determined three-dimensional position and second three-axis angular orientation of the TCR RF Originator device 1720.

The method further comprises determining the three-dimensional position of the TCR RF Transponder device 1710' relative to the TCR RF Originator device 1720 based on unwrapped carrier phase range (CPR) samples.

The method further comprises determining the three-dimensional position of the TCR RF Transponder device 1710' relative to the TCR RF Originator device 1720 by determining at least two of three angles of the TCR RF Transponder device 1710' relative to a coordinate frame (XY, XZ, YZ) of the TCR RF Originator device 1720 based on determining CPD measurement of phase difference by subtracting 1) a first carrier phase range (CPR) determined distance between a transmitting antenna of the TCR RF Transponder device 1710' and a first receiving antenna of a pair of receiving antennae of the at least three receiver antennae of the TCR RF Originator device 1720, from 2) a second CPR determined distance between the transmitting antenna of the TCR RF Transponder device 1710' and a second receiving antenna of the pair of receiving antennae of at least three receiver antennae of the TCR RF Originator device 1720.

The method of determining a position and orientation of an object where determining the three-dimensional position of the TCR RF Transponder device 1710' relative to the TCR RF Originator device 1720 by determining at least two of three angles of the TCR RF Transponder device 1710' relative to the coordinate frame of the TCR RF Originator device 1720 further comprises calculating an angle of the TCR RF Transponder device 1710' relative to the coordinate frame 1722 of the TCR RF Originator device 1720 by determining a quotient of the determined CPD over a baseline distance between the pair of receiving antennae of the TCR RF Originator device 1720.

The method further comprises providing each antenna of the first 1714 and second 1724 constellations of antennae as circular polarized antennae.

The method further comprises providing at least one but not all of the first 1714 or second 1724 constellations of antennae as linear polarized antennae, and providing the remainder of the first 1714 or second 1724 constellations of antennae as circular polarized antennae.

Regarding the routines presented in the methods illustrated in FIG. 13, FIGS. 15-16, FIGS. 18-19, FIG. 27, FIGS. 29-30 and FIGS. 32-33 it should be appreciated that while they are expressed with discrete steps, these steps should be viewed as being logical in nature and may or may not correspond to any actual, discrete steps. Moreover, while these routines are set forth in a particular order in carrying out various functionality, the order that these steps are presented should not be construed as the only order in which the various steps may be carried out in their respective routines. Further, those skilled in the art will appreciate that logical steps may be combined together or be comprised of multiple steps.

While certain features of the described illustrative embodiments have been illustrated as described herein, many modifications, substitutions, changes and equivalents will now occur to those skilled in the art. It is, therefore, to be understood that the appended claims are intended to cover all such modifications and changes as fall within the scope of the illustrative embodiments. It should be understood the illustrative embodiments described herein have been presented by way of example only, not limitation, and various changes in form and details may be made. Any portion of the apparatus and/or methods described herein may be combined in any combination, except mutually exclusive combinations. The illustrative embodiments described herein can include various combinations and/or sub-combinations of the functions, components and/or features of the different illustrative embodiments described.

What is claimed is:

1. A position determining system comprising:
   a first radio frequency (RF) device comprising:
      at least one antenna to receive and transmit RF signals, and
      a first radio unit in communication with the at least one antenna;
   a second RF device comprising:
      a constellation of antennae including at least three receiving antennae, and
      a second radio unit in communication with the constellation of antennae; and
   a processor to determine a three-dimensional position of the first RF device relative to the second RF device, the determining comprising:
      computing at least two of three angles in the second RF device coordinate frame (XY, XZ and YZ) based on carrier phase difference (CPD) measurements taken between each pair of the at least three receiving antennae when receiving a single RF signal transmitted from the at least one antenna of the first RF device, and
      computing a distance between the first RF device and the second RF device based on a baseband code phase range measurement of round-trip RF time-of-flight (TOF) between the first RF and second RF devices.

2. The position determining system of claim 1, wherein the determining of the three-dimensional position of the first RF device relative to the second RF device further comprises computing an intersection of three planes passing through each of the at least three receiving antenna locations.

3. The position determining system of claim 1, wherein the computing of the distance between the first RF device and the second RF device is further based on a carrier phase range (CPR) measurement of the distance between the first RF and second RF devices.

4. The position determining system of claim 1, wherein the first RF device comprises a handheld controller.

5. The position determining system of claim 1, where the second RF device further comprises a display driver to render images in one of a virtual reality or an augmented reality environment based on the determined three-dimensional position of the first RF device relative to the second RF device.

6. The position determining system of claim 1, wherein the at least one antenna of the first RF device and the constellation of antennae of the second RF device comprise circular polarized antennae.

7. The position determining system of claim 1, wherein the at least one antenna comprises one of linear polarized antenna or circular polarized antenna, and wherein the constellation of antennae comprises the other one of the linear polarized antennae or the circular polarized antennae.

8. The position determining system claim 1, wherein at least one of the CPD measurements is derived from (1) a first carrier phase measured from the at least one antenna of the first RF device at a first receiving antenna of a pair of the at least three receiving antennae of the second RF device, and (2) a second carrier phase measured from the at least one antenna of the first RF device at a second receiving antenna of the pair of the at least three receiving antennae of the second RF device.

9. The position determining system of claim 2, wherein the computing of the intersection comprises computing three angles in the second RF device coordinate frame (XY, XZ and YZ).

10. The position determining system of claim 8, wherein the processor is further to calculate an angle of bearing to the first RF device relative to the coordinate frame of the second RF device based on a quotient of one of the CPD measurements over a baseline distance between the pair of the at least three receiving antennae of the second RF device.

11. A position and orientation determining system comprising:
    a first radio frequency (RF) device comprising:
       at least one antenna to receive and transmit RF signals,
       a first radio unit in communication with the at least one antenna, and
       an inertial measurement unit (IMU);
    a second RF device comprising:
       a constellation of antennae including at least three receiving antennae,
       a second radio unit in communication with the constellation of antennae; and
    a processor to determine a three-dimensional position and three-axis angular orientation of the first RF device relative to the second RF device, the determining comprising:
       computing at least two of three angles in the second RF device coordinate frame (XY, XZ and YZ) based on carrier phase difference (CPD) measurements taken between each pair of the at least three receiving antennae when receiving a single RF signal transmitted from the at least one antenna of the first RF device,
       estimating a direction of a gravity vector generated by the IMU, and
       computing a distance between the first RF device and the second RF device based on a baseband code phase range measurement of round-trip RF time-of-flight (TOF) between the first RF and second RF devices.

12. The position and orientation determining system of claim 11, wherein the determining of the three-dimensional position of the first RF device relative to the second RF device further comprises computing an intersection of three planes passing through each of the at least three receiving antenna locations.

13. The position and orientation determining system of claim 11, wherein the computing of the distance between the first RF device and the second RF device is further based on a carrier phase range (CPR) measurement of the distance between the first RF and second RF devices.

14. The position and orientation determining system of claim 11, wherein the first RF device comprises a handheld controller.

15. The position and orientation determining system of claim 11, where the second RF device further comprises a display driver to render images in one of a virtual reality or an augmented reality environment based on the determined three-dimensional position of the first RF device relative to the second RF device.

16. The position and orientation determining system of claim 11, wherein at least one of the CPD measurements is derived from (1) a first carrier phase measured from the at least one antenna of the first RF device at a first receiving antenna of a pair of the at least three receiving antennae of the second RF device, and (2) a second carrier phase measured from the at least one antenna of the first RF device at a second receiving antenna of the pair of the at least three receiving antennae of the second RF device.

17. The position and orientation determining system of claim 12, wherein the computing of the intersection comprises computing three angles in the second RF device coordinate frame (XY, XZ and YZ).

18. The position and orientation determining system of claim 16, wherein the processor is further to calculate an angle of bearing to the first RF device relative to the coordinate frame of the second RF device based on a quotient of one of the CPD measurements over a baseline distance between the pair of the at least three receiving antennae of the second RF device.

19. A method of determining a three-dimensional position of a first radio frequency (RF) device relative to a second RF device, the method comprising:
providing the first RF device, the first RF device comprising:
at least one antenna to receive and transmit RF signals, and
a first radio unit in communication with the at least one antenna;
providing the second RF device, the second RF device comprising:
a constellation of antennae including at least three receiving antennae,
a second radio unit in communication with the constellation of antennae, and
a processor in communication with the second radio unit and the constellation of antennae; and determining, by the processor of the second RF device, a three-dimensional position of the first RF device relative to the second RF device, wherein the determining comprises:
computing at least two of three angles in the second RF device coordinate frame (XY, XZ and YZ) based on carrier phase difference (CPD) measurements taken between each pair of the at least three receiving antennae when receiving a single RF signal transmitted from the at least one antenna of the first RF device, and
computing a distance between the first RF device and the second RF device based on a baseband code phase range measurement of round-trip RF time-of-flight (TOF) between the first RF and second RF devices.

20. The method of claim 19, wherein the determining of the three-dimensional position of the first RF device relative to the second RF device further comprises computing an intersection of three planes passing through each of the at least three receiving antenna locations.

21. The method of claim 19, wherein the computing of the distance between the first RF device and the second RF device is further based on a carrier phase range (CPR) measurement of the distance between the first RF and second RF devices.

22. The method of claim 19, wherein at least one of the CPD measurements is derived from (1) a first carrier phase measured from the at least one antenna of the first RF device at a first receiving antenna of a pair of the at least three receiving antennae of the second RF device, and (2) a second carrier phase measured from the at least one antenna of the first RF device at a second receiving antenna of the pair of the at least three receiving antennae of the second RF device.

23. The method of claim 19, wherein the second RF device further comprises a graphical display, and wherein the method further comprises rendering an image on the graphical display in one of a virtual reality or an augmented reality environment based on the determined three-dimensional position of the first RF device relative to the second RF device.

24. The method of claim 19, wherein the first RF device further comprises an inertial measurement unit (IMU) to generate a gravity vector, and wherein the method further comprises:
estimating a direction of the gravity vector; and
determining a three-axis angular orientation of the first RF device relative to the second RF device based on the estimated direction of the gravity vector.

25. The method of claim 20, wherein the computing of the intersection comprises computing three angles in the second RF device coordinate frame (XY, XZ and YZ).

26. The method of claim 22, wherein the determining of the three-dimensional position of the first RF device relative to the second RF device further comprises calculating an angle of bearing to the first RF device relative to the coordinate frame of the second RF device based on a quotient of one of the CPD measurements over a baseline distance between the pair of the at least three receiving antennae of the second RF device.

* * * * *